United States Patent
Hara et al.

(10) Patent No.: US 8,125,963 B2
(45) Date of Patent: Feb. 28, 2012

(54) RADIO TRANSMISSION CONTROL METHOD, RADIO RECEIVER APPARATUS, AND RADIO TRANSMITTER APPARATUS

(75) Inventors: Yoshitaka Hara, Tokyo (JP); Akinori Taira, Tokyo (JP); Tomoaki Otsuki, Noda (JP); Kenji Sudo, Noda (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 420 days.

(21) Appl. No.: 10/567,339

(22) PCT Filed: Jul. 29, 2004

(86) PCT No.: PCT/JP2004/010845
§ 371 (c)(1),
(2), (4) Date: Nov. 30, 2006

(87) PCT Pub. No.: WO2005/013528
PCT Pub. Date: Feb. 10, 2005

(65) Prior Publication Data
US 2008/0056217 A1 Mar. 6, 2008

(30) Foreign Application Priority Data
Aug. 4, 2003 (JP) .................................. 2003-286184

(51) Int. Cl.
*H04W 4/00* (2009.01)
(52) U.S. Cl. ...................... 370/334; 455/454; 455/562.1; 455/95; 455/575.1; 455/450; 455/451; 370/267; 370/347; 370/342; 375/267; 375/299
(58) Field of Classification Search .................. 455/454, 455/562.1, 560.1, 575.7, 553.1, 95, 450, 455/501; 375/267, 299; 370/267, 334, 347, 370/610, 342
See application file for complete search history.

(56) References Cited

U.S. PATENT DOCUMENTS

| | | | | |
|---|---|---|---|---|
| 6,317,466 B1 * | 11/2001 | Foschini et al. | | 375/267 |
| 2003/0043928 A1 | 3/2003 | Ling et al. | | |
| 2003/0125040 A1 * | 7/2003 | Walton et al. | | 455/454 |
| 2004/0002364 A1 * | 1/2004 | Trikkonen et al. | | 455/562.1 |

FOREIGN PATENT DOCUMENTS

| | | |
|---|---|---|
| JP | 11-205205 | 7/1999 |
| JP | 2000-101667 | 4/2000 |
| JP | 2000-209145 | 7/2000 |

(Continued)

OTHER PUBLICATIONS

Heath, Robert W. et al., "Antenna Selection for Spatial Multiplexing Systems with Linear Receivers", IEEE Communications Letters, vol. 5, No. 4, pp. 142-144, Apr. 2001.

(Continued)

*Primary Examiner* — Nimesh Patel
(74) *Attorney, Agent, or Firm* — Oblon, Spivak, McClelland, Maier & Neustadt, L.L.P.

(57) ABSTRACT

A radio communication method and apparatus generate a plurality of information signals and transmit the signals to a communication partner from a plurality of antennas. A plurality of combination of signals to be transmitted are selected. A transmission evaluation value is determined based on the signal noise ratio of each signal. After all combinations are evaluated, a transmission format suitable for sending a combination of signals is determined based on a highest evaluation value.

2 Claims, 33 Drawing Sheets

FOREIGN PATENT DOCUMENTS

| | | |
|---|---|---|
| JP | 2001-223623 A | 8/2001 |
| JP | 2001-333002 | 11/2001 |
| JP | 2002-111557 A | 4/2002 |
| JP | 2002-190759 | 7/2002 |
| JP | 2002-319885 | 10/2002 |
| JP | 2003-32745 | 1/2003 |
| JP | 2003-110474 | 4/2003 |
| JP | 2003-179965 | 6/2003 |
| JP | 2004-194262 | 7/2004 |
| WO | WO 01/78254 | 10/2001 |
| WO | WO 02/05506 A2 | 1/2002 |
| WO | WO 02/47286 | 6/2002 |
| WO | 02/075953 | 9/2002 |
| WO | WO 02/082689 A2 | 10/2002 |
| WO | 03/001702 | 1/2003 |
| WO | WO 03/058871 A1 | 7/2003 |

OTHER PUBLICATIONS

Milani, Alessio et al., "Improving Protocol Performance in BLAST-based wireless Systems Using Channel Adaptive Antenna Selection", IEEE VTC, vol. 1, No. 1, pp. 409-413, May 2002.

Milani, Alessio et al., "On the use of Per- Antenna Rate and Power Adaptation in V-BLAST Systems for Protocol Performance Improvement", IEEE VTC, vol. 4. pp. 2126-2130, Sep. 2002.

A. van Zelst et al.; "Space Division Multiplexing (SDM) for OFDM systems" 2000 IEEE $51^{st}$ Vehicular Technology Conference. Proceedings. VTC2000-Springer, vol. 2, May 15, 2000; pp. 1070-1074. XP-002534579.

European Office Action issued Feb. 15, 2011, in Patent Application No. 04 771 058.7.

* cited by examiner

FIG. 5
(a) TERMINAL A ---→ TERMINAL B
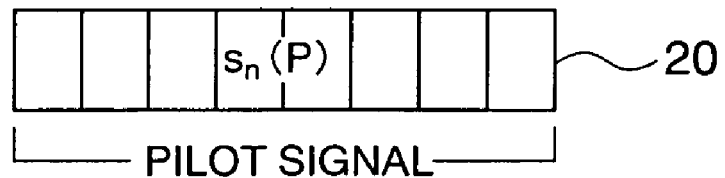
(b) TERMINAL B ---→ TERMINAL A (CONTROL SIGNAL)
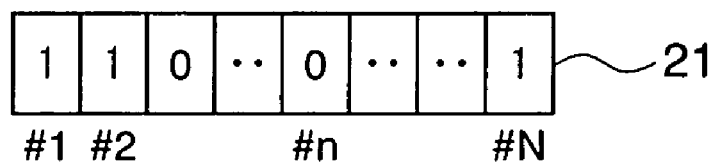

FIG. 13

◆ SINR PREDICTION $$\Gamma_n = \frac{|h_n^H v_n(p)|^2}{v_n^H(\sum_{n0} h_{n0}h_{n0}^H + \hat{P}_N I)v_n - |h_n^H v_n(p)|^2} \overset{41}{\frown}$$

$v_n$: RECEPTION WEIGHT  $v_n = (\sum_{n0} h_{n0}h_{n0}^H)^{-1} h_{n0}$   IN CASE OF ZF STANDARD TYPE $v_n = (\sum_{n0} h_{n0}h_{n0}^H + \hat{P}_N I)^{-1} h_{n0}$   IN CASE OF MMSE STANDARD TYPE $\hat{P}_N$: INTERFERENCE NOISE POWER ESTIMATED VALUE

FIG. 14

| SINR[dB] | EVALUATION VALUE (ACCEPTANCE OR REJECTION OF USE) |
|---|---|
| -3 | 0 |
| -2 | 0 |
| ⋮ | ⋮ |
| 3 | 0 |
| 4 | 1 |
| ⋮ | ⋮ |
| 28 | 1 |

FIG. 15

| COMBINATION OF SIGNALS (#1,#2,#3) 1; USE, 0; NON-USE | OUTPUT SINR [dB] ($\Gamma_1, \Gamma_2, \Gamma_3$) | EVALUATION VALUE OF EACH SIGNAL (#1,#2,#3) | TOTAL OF EVALUATION VALUES |
|---|---|---|---|
| (1, 0, 0) | (7.0, 0.0, 0.0) | (1, 0, 0) | 1 |
| (0, 1, 0) | (0.0, 9.3, 0.0) | (0, 1, 0) | 1 |
| (0, 0, 1) | (0.0, 0.0, 6.2) | (0, 0, 1) | 1 |
| (1, 1, 0) | (6.0, 7.0, 0.0) | (1, 1, 0) | 2 |
| (0, 1, 1) | (0.0, 4.3, 2.9) | (0, 1, 0) | 1 |
| (1, 0, 1) | (2.8, 0.0, 1.1) | (0, 0, 0) | 0 |
| (1, 1, 1) | (−0.5, 3.4, 0.3) | (0, 0, 0) | 0 |

※ IN CASE OF THREE TRANSMISSION ANTENNAS

SELECT LARGEST EVALUATION VALUE

FIG. 17

| TRANSMISSION SPECIFICATION NUMBER | SINR [dB] | MODULATION SCHEME | CODING RATIO | EVALUATION VALUE (TRANSMISSION SPEED) |
|---|---|---|---|---|
| 0 | ~-3 | No use | No use | 0.000 |
| 1 | -3~-2 | QPSK | 1/8 | 0.500 |
| 2 | -2~-1 | QPSK | 1/7 | 0.571 |
| 3 | -1~0 | QPSK | 1/6 | 0.666 |
| 4 | 0~1 | QPSK | 1/5 | 0.800 |
| 5 | 1~2 | QPSK | 1/4 | 1.000 |
| 6 | 2~3 | QPSK | 1/3 | 1.333 |
| ⋮ | ⋮ | ⋮ | ⋮ | ⋮ |
| 31 | 27~ | 16QAM | 3/4 | 12.000 |

Columns: 61, 62, 63, 64, 65

FIG. 18

| 71 | 72 | 73 | 74 |

| COMBINATION OF SIGNALS (#1,#2,#3) 1; USE, 0; NON-USE | OUTPUT SINR [dB] ($\Gamma_1, \Gamma_2, \Gamma_3$) | EVALUATION VALUE OF EACH SIGNAL (TRANSMISSION SPEED)(#1,#2,#3) | TOTAL OF EVALUATION VALUES |
|---|---|---|---|
| (1,0,0) | (7.0,-,-) | (6.0,0.0,0.0) | 6.0 |
| (0,1,0) | (-,9.3,-) | (0.0,7.2,0.0) | 7.2 |
| (0,0,1) | (-,-,6.2) | (0.0,0.0,4.8) | 4.8 |
| (1,1,0) | (6.0,7.0,-) | (4.5,6.0,0.0) | 10.5 |
| (0,1,1) | (-,4.3,2.9) | (0.0,2.2,1.3) | 3.8 |
| (1,0,1) | (2.8,-,1.1) | (1.3,0.0,1.0) | 2.3 |
| (1,1,1) | (-0.5,3.4,0.3) | (0.6,1.5,1.8) | 2.9 |

※ IN CASE OF THREE TRANSMISSION ANTENNAS

SELECT LARGEST EVALUATION VALUE

FIG. 24

AVERAGE SINR $\Gamma_n = E_l[\Gamma_{n,l}]$ $\Gamma_{n,l}$: SINR (SUB-CARRIER UNIT)

※n: TRANSMISSION ANTENNA、l: SUB-CARRIER NUMBER

FIG. 29

| MAGNITUDE OF POWER OF EACH SIGNAL (#1,#2,#3) | OUTPUT SINR [dB] ($\Gamma_1, \Gamma_2, \Gamma_3$) | TRANSMISSION EVALUATION VALUE OF EACH SIGNAL (TRANSMISSION SPEED)(#1,#2,#3) | TOTAL OF TRANSMISSION EVALUATION VALUES |
|---|---|---|---|
| (3,0,0) | (14.0, -, -) | (9.5,0.0,0.0) | 9.5 |
| (0,3,0) | ( -,15.3, -) | (0.0,11.2,0.0) | 11.2 |
| (0,0,3) | ( -, -,2.2) | (0.0,0.0,8.8) | 8.8 |
| (2,1,0) | (9.1,6.8, -) | (5.4,4.5,0.0) | 9.9 |
| (0,2,1) | ( -,7.3,2.9) | (0.0,6.2,1.3) | 7.5 |
| ⋮ | ⋮ | ⋮ | ⋮ |
| (1,1,1) | (-0.5,3.4,0.3) | (0.6,1.5,1.8) | 2.9 |

75 72 73 74

※ IN CASE OF THREE TRANSMISSION ANTENNAS

SELECT LARGEST TRANSMISSION SPEED

RADIO TRANSMISSION CONTROL METHOD, RADIO RECEIVER APPARATUS, AND RADIO TRANSMITTER APPARATUS

TECHNICAL FIELD

The present invention relates to a radio transmission control method for a MIMO system in which a radio receiver apparatus and a radio transmitter apparatus respectively use a plurality of antennas to perform SDM transmission, and a radio receiver apparatus and a radio transmitter apparatus.

BACKGROUND ART

Recently, radio communications has come into widespread use remarkably owing to its convenience. As a result, there is an urgent demand for taking measures to deal with the shortage of use frequencies. As one of the techniques of using the use frequency effectively, there is a MIMO (Multiple-Input Multiple-Output) system for performing high-speed signal transmission using a plurality of antennas in a transmitter/receiver, which is under active studies. In the MIMO system, it is known that a higher capacity can be achieved by using a plurality of antennas in a transmitter/receiver, compared with the case where the transmitter/receiver has one antenna.

In the MIMO system, SDM (Space Division Multiplexing) transmission has been mostly studied, in which signals are sent individually from a plurality of transmission antennas, and each signal is extracted with signal processing on a receiving side. Hereinafter, a conventional technique will be described based on representative documents (for example, see Non-Patent Documents 1 and 2) related to the SDM transmission.

FIGS. 32 and 33 show a configuration of a transmitter/receiver performing the SDM transmission. In the SDM transmission, time-series signals are sent individually from respective antennas of a transmitter, and as shown in FIG. 33, a receiver receives the signals using beam formation corresponding to each transmission signal. A configuration of this signal processing will be described below. The description will be made assuming that the number of transmission antenna is N, the number of reception antennas is M, the channel gain from a transmission antenna n to a reception antenna m is $h_{mn}$, and the propagation characteristics between the transmitter and the receiver is a matrix $H=[h_{mn}]$.

As shown in FIG. 32, at a terminal A1 of the transmitter, time-series transmission signals $s_n(p)$ (n=1, ..., N) are transmitted from N transmission antennas 3. The transmission signals pass through a propagation path 5 to be received by M reception antennas 4. At a terminal B2 of the receiver, reception weight multiplying parts 131, 132, 133 multiply the reception signals with a weight $v_m$ to thereby perform signal combining.

Hereinafter, the above-mentioned series of processes will be shown using mathematical expressions. Assuming that a reception signal at the reception antenna 4 is $x_m(p)$, a reception vector $x(p)=[x_1(p), \ldots, x_M(p)]^T$ (T is a transposition) is given by the following expression.

$$x(p)=\Sigma_{n=1}^N h_n s_n(p)+z(p)$$

Herein, $s_1(p), \ldots, s_N(p)$ represents a transmission signal; $h_n=[h_{1n}, \ldots, h_{Mn}]^T$ represents a propagation vector from the transmission antenna 3 to the M reception antennas 4; $z(p)=[z_1(p), \ldots, z_M(p)]^T$ represents a noise and interference vector; and $Z_m(p)$ represents a noise and interference component at the antenna 4.

Furthermore, the terminal B2 on the receiving side determines a weight $v_n=[v_{n1}, \ldots, v_{nM}]^T$ suitable for receiving the signal $s_n(p)$ from the transmission antenna 3. An output $y_n(p)$ after the signal combining is given by the following expression.

$$y_n(p)=v_n^T x(p)=\Sigma_{n0=1}^N (v_n^T h_{n0})s_{n0}(p)+V_n^T z(p)$$

Although there are various methods for determining the reception weight $v_n$, each reception weight $v_n$ is determined to get the transmission signal $s_n(p)$. For example, according to the weight determination based on a ZF (Zero Forcing) standard, the weight $v_n$ is determined so as to satisfy the following expressions.

$v_n^T h_{n0}=1$ where $n0=n$.

$v_n^T h_{n0}=0$ where $n0$ is other than $n$.  (Expression 1)

(Expression 1) shows the condition under which a desired signal $s_n(p)$ is received strongly, and the other signals $s_{n0}(p)$ (n0 is an integer other than n) are suppressed. Thus, only the desired signal can be received satisfactorily. Furthermore, by receiving a signal using different weights $v_n$ with respect to different n, a plurality of signals can be separated to be taken out, and hence, division multiplexing can be performed spatially. Herein, although a method for determining a weight based of the ZF standard has been described as an example, there is also a similar weight algorithm such as an MMSE synthesis method. The purpose of any weight algorithm is basically to suppress signals other than a desired one in the same way as in (Expression 1).

Thus, by suppressing signals other than a desired one among a plurality of signals at the terminal B2 on the receiving side, SDM (Space Division Multiplexing) can be realized. In the SDM transmission, a plurality of signals are transmitted simultaneously, so there is an advantage that high-speed signal transmission can be performed, compared with a conventional transmission system in which a transmitter/receiver uses a single antenna.

However, actually, although (Expression 1) can be realized in the case where the number N of multiplexed signals is M or less (N≦M), it cannot be realized in the case of N>M. In order to understand the contents thereof, more detailed description will be made. In (Expression 1), the vectors $v_n$ and $h_{n0}$ can be respectively expressed as one vector on an M-dimensional space. Furthermore, $v_n^T h_{n0}$ being a vector inner product, and $v_n^T h_{n0}$ being 0 correspond to a state where $v_n$ and $h_{n0}$ are orthogonal to each other on the M-dimensional space. Although one vector $v_n$ orthogonal to (M−1) independent vectors $h_{n0}$ can be set on the M-dimensional space, it is impossible to set a vector $v_n$ orthogonal to M or more independent vectors $h_{n0}$. Thus, it is theoretically impossible to satisfy the relationship $v_n^T h_{n0}=0$ with respect to M or more independent vectors $h_{n0}$, and (Expression 1) does not hold for N>M.

Accordingly, in the case where the number N of multiplexed signals is larger than the number M of reception antennas, any weight $v_n$ used on the receiving side cannot suppress other signals sufficiently. Therefore, the quality of a reception signal degrades rapidly. In order to avoid this situation, there is required a method of performing space division multiplexing transmission smoothly in an environment where the number of transmission antennas is larger than the number of reception antennas. However, such solution measures have not been introduced as yet.

Non-Patent Document 1: A. V. Zelst, R. V. Nee, and G. A. Awater, "Space Division Multiplexing (SDM) for OFDM systems" IEEE Proc. of VTC 2000 Spring, pp. 1070 to 1074, 2000

Non-Patent Document 2: Kurosaki, Asai, Sugiyama, Umehira, "100 Mbit/s. SDM-COFDM over MIMO channel for broadband mobile communications" Technical Report, RCS 2001-135, October 2001

DISCLOSURE OF THE INVENTION

Problems to be Solved by the Invention

According to a beam formation method of a conventional procedure, in the case where the number of transmission antennas is smaller than the number of reception antennas, Space Division Multiplexing can be performed smoothly. However, in actual radio communication, there are a number of environments where the number of transmission antennas is larger than the number of reception antennas. In such a case, when different signals are sent simultaneously from respective transmission antennas using a conventional transmission method, the signals cannot be separated from one another on a receiving side, which greatly degrades the quality of the reception signals. Thus, there is a demand for a method capable of separating signals from one another and transmitting a signal of high quality in an environment where the number of transmission antennas is larger than the number of reception antennas.

Furthermore, a method of sending signals using all the transmission antennas does not necessarily have a satisfactory transmission efficiency even in the case where the number of transmission antennas is smaller than the number of reception antennas. For example, in the case where two propagation vectors $h_{n0}$ and $h_{n1}$ are similar to each other, suppressing one signal $h_{n1}$ may also suppress the desired signal $h_{n0}$. In such a case, it may be better to stop one of the signals, rather than to send both signals, for performing signal transmission more satisfactory.

Thus, controlling a procedure for sending signals raises the possibility of attaining more efficient signal transmission. There is a demand for a control method and a communication system between a transmitter and a receiver, enabling more efficient signal transmission over the MIMO system.

Means for Solving the Problem

According to as aspect of this disclosure, there is provided a radio communication method for a radio communication system in which output signals are generated from a plurality of information signals and then transmitted to a system of a communication partner from a plurality of antennas. The method includes receiving control information transmitted by the system of the communication partner and determining, based on the received control information, a first weight corresponding to the plurality of antennas for one of the plurality of information signals modulated by a first modulation scheme and encoded by a first encoding method, and a second weight corresponding to the plurality of antennas for another one of the plurality of information signals modulated by a second modulation scheme and encoded by a second encoding method. A first operation result is generated by multiplying the one of the plurality of information signals by the first weight, and a second operation result is generated by multiplying the another one of the plurality of information signals by the second weight. Based on the first operation result and the second operation result, a plurality of the output signals are generated, where each corresponds to one of the plurality of antennas. The plurality of the output signals are transmitted to the system of the communication partner. The control information includes information on the first and second weights and transmission format information, on modulation scheme and encoding method, corresponding to the information on the first and second weights. The modulation scheme and the encoding method correspond to the transmission format information, which is determined based on a signal quality calculated on the assumption that the output signals of the plurality of antennas are generated utilizing the weights corresponding to the information on the first and second weights and transmitted simultaneously.

Further, according to another aspect of this disclosure, there is provided a radio communication system in which output signals are generated from a plurality of information signals and then transmitted to a system of a communication partner from a plurality of antennas. The system includes a reception device for receiving control information transmitted by the system of the communication partner and a weight determining device for determining, based on the received control information, a first weight corresponding to the plurality of antennas for one of the plurality of information signals modulated by a first modulation scheme and encoded by a first encoding method, and a second weight corresponding to the plurality of antennas for another one of the plurality of information signals modulated by a second modulation scheme and encoded by a second encoding method. The system further includes an operation device for generating a first operation result by multiplying the one of the plurality of information signals by the first weight, and generating a second operation result by multiplying the another one of the plurality of information signals by the second weigh. A transmission device is also provided which generates, based on the first operation result and the second operation result, a plurality of the output signals each corresponding to one of the plurality of antennas, and transmits the plurality of the output signals to the system of the communication partner. The control information includes information on the first and second weights and transmission format information, on modulation scheme and encoding method, corresponding to the information. The modulation scheme and encoding method correspond to the transmission format information being determined based on the signal quality calculated on the assumption the output signals of the plurality of antennas are generated utilizing the weights corresponding to the information and transmitted simultaneously.

BRIEF DESCRIPTION OF THE DRAWINGS

FIG. 5 A format view of a pilot signal and a control signal used in Embodiment 1.

FIG. 13 A view showing an SINR prediction method in Embodiment 4.

FIG. 14 A view of a table showing a relationship between an output SINR and an evaluation value in Embodiment 4.

FIG. 15 A view of a table showing a correspondence between a combination of signals and an evaluation value in Embodiment 4.

FIG. 17 A view of a table showing a relationship among an output SINR, a transmission format, and an evaluation value in Embodiment 5.

FIG. 18 A view of a table showing a relationship between an output SINR and an evaluation value in Embodiment 5.

FIG. 24 A view of a calculation method of an average output SINR in Embodiment 7.

FIG. 29 A view of a table showing a correspondence between a combination of signal powers and an evaluation value in Embodiment 10.

BEST MODES FOR CARRYING OUT THE INVENTION

Hereinafter, each embodiment of the present invention will be described with reference to the drawings.

Embodiment 1

This embodiment relates to an efficient signal transmission method and communication system in a MIMO system in which a plurality of signals are subjected to space division multiplexing (SDM) transmission. In the following description, a transmitting side of an information signal will be referred to as a terminal A, and a receiving side thereof will be referred to as a terminal B.

Figure 1:
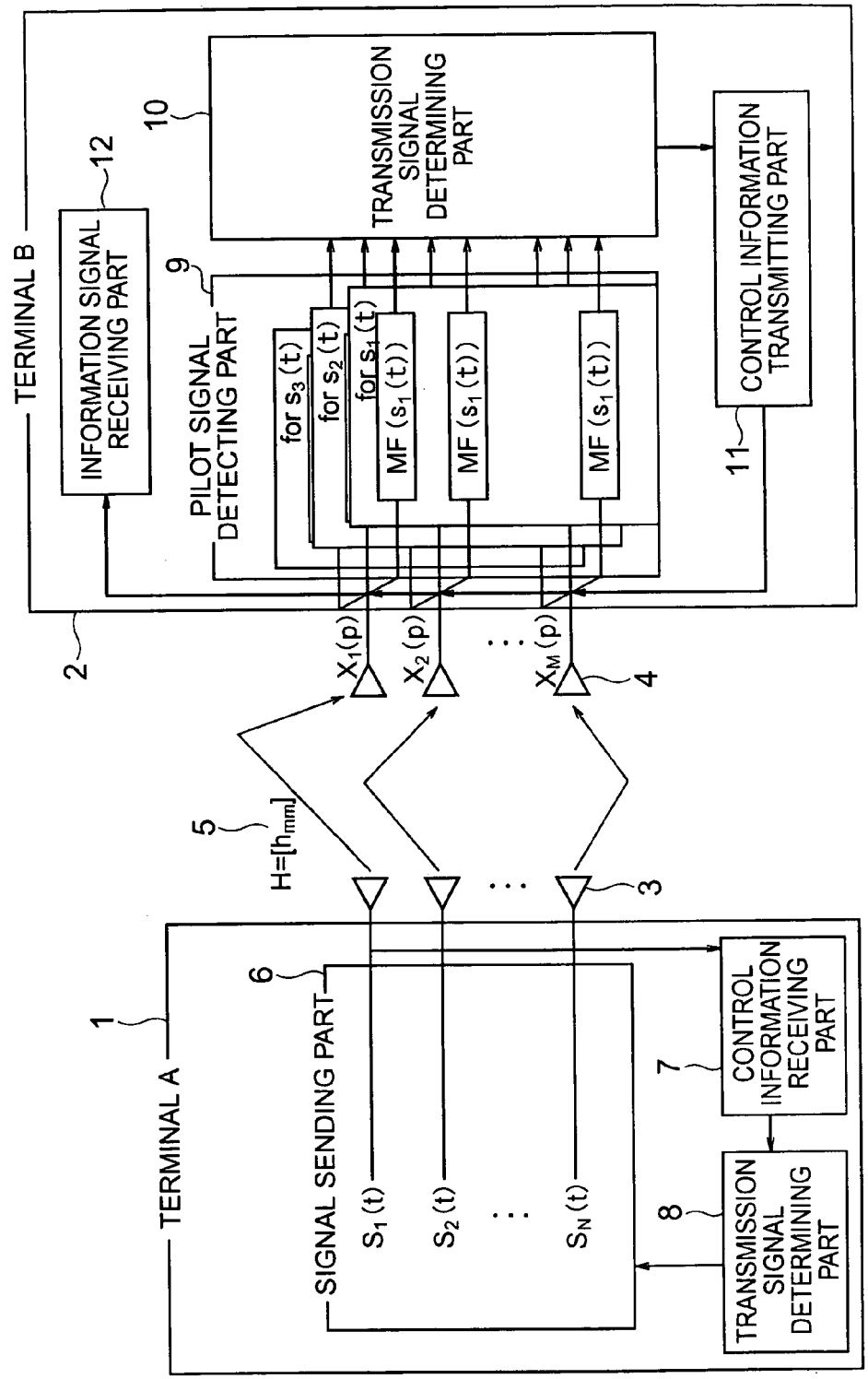
FIG. 1 A basic structural view of a transmitter/receiver for a MIMO system in Embodiment 1 of the present invention.
Figure 2:
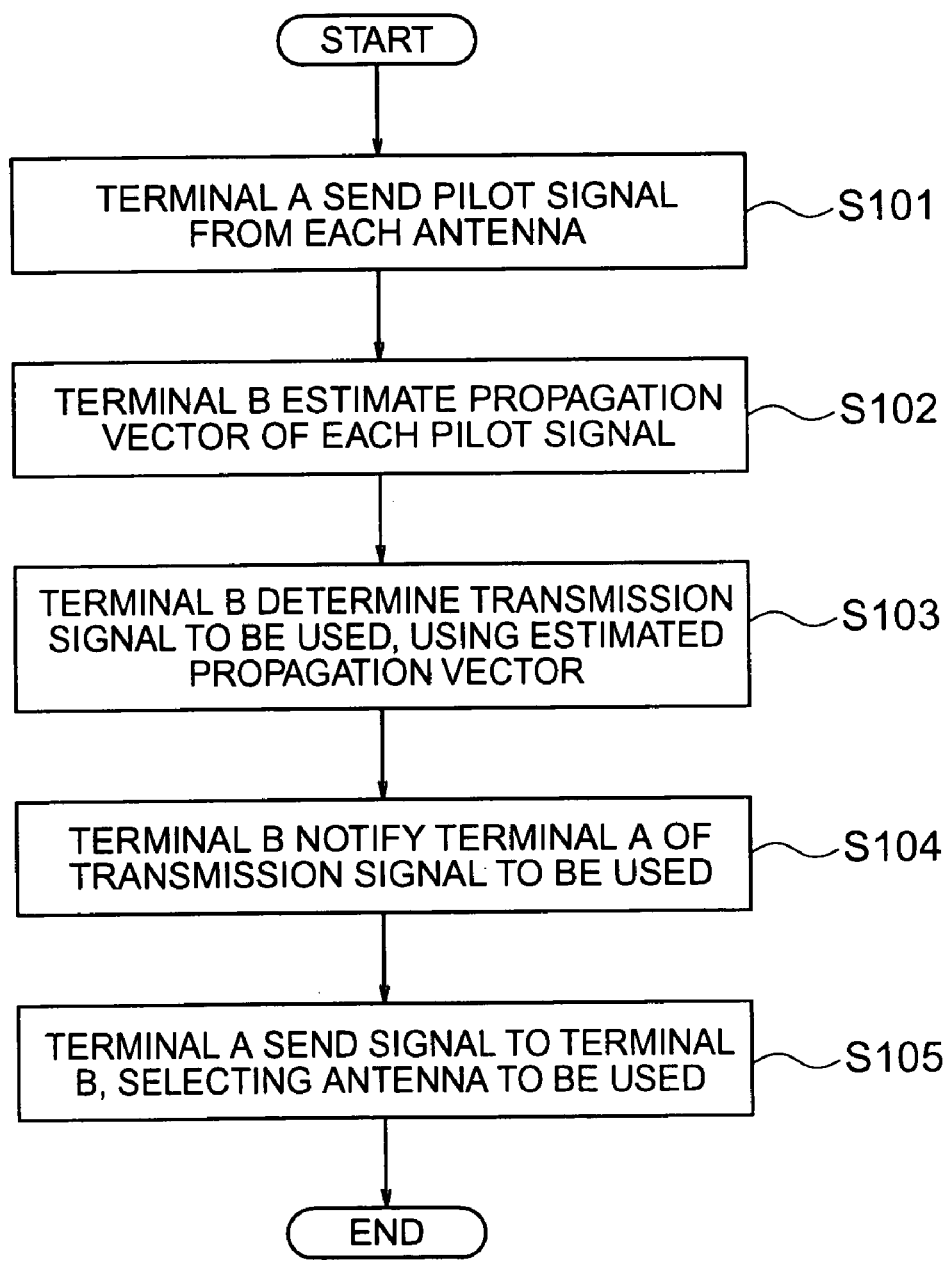
FIG. 2 A flowchart showing a transmission control method in Embodiment 1.
Figure 3:
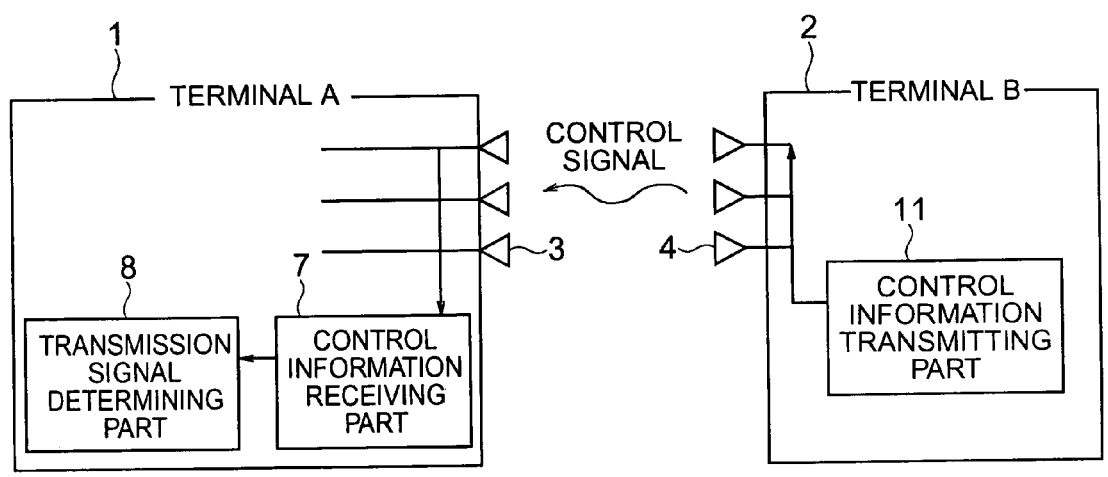
FIG. 3 A view showing a situation in which a control signal is transmitted from a terminal B to a terminal A in Embodiment 1.
Figure 4:
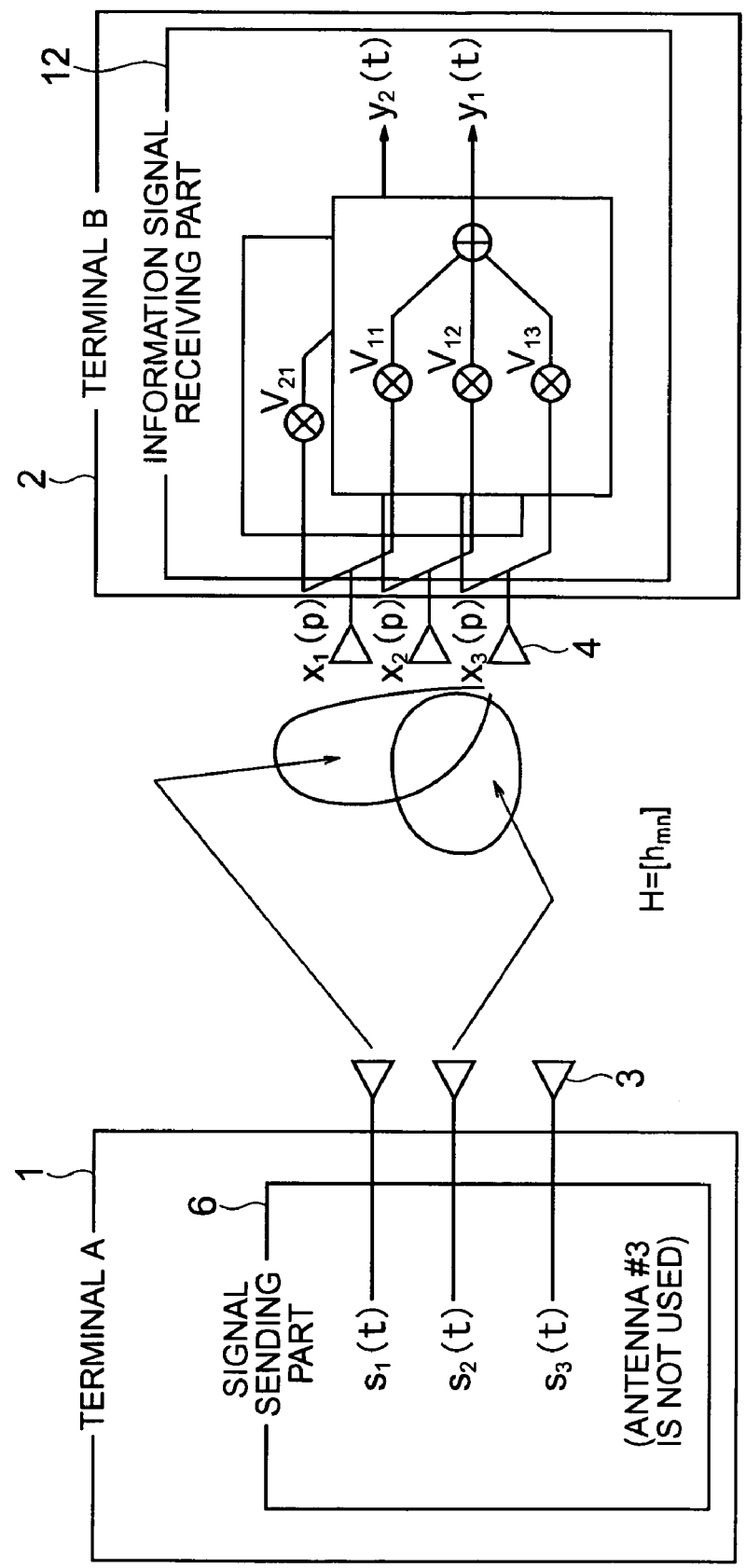
FIG. 4 A view showing a situation in which an information signal is transmitted from the terminal A to the terminal B in Embodiment 1.
Figure 6:
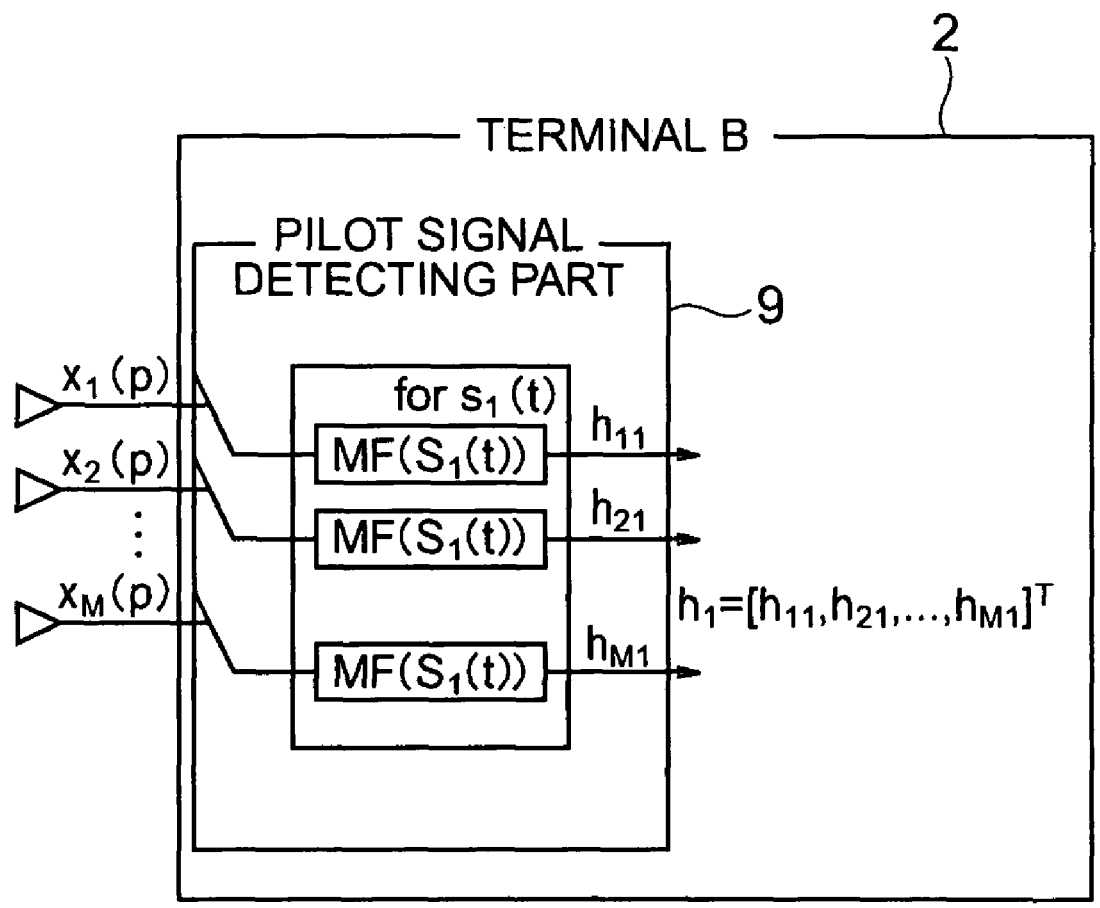
FIG. 6 A structural view of a pilot signal detecting part of the terminal B in Embodiment 1.

FIG. 1 is a most basic transmission/reception structural view showing this embodiment. FIG. 2 is a flowchart showing a control procedure of this embodiment. FIG. 3 shows how the terminal B notifies the terminal A of a control signal (control information) FIG. 4 shows how the terminal A transmits an information signal to the terminal B. In FIG. 5, (a) represents a pilot signal sent from the terminal A, and (b) represents a control signal transmitted from the terminal B to the terminal A. FIG. 6 shows a configuration of a pilot signal detecting part at the terminal B. Hereinafter, this embodiment will be described with reference to FIGS. 1 to 6.

This embodiment relates to a high efficient signal transmission method that is applicable to a MIMO system irrespective of the number of transmission/reception antennas in the system.

Referring to FIG. 2, a basic control procedure of this embodiment will be described. First, in this embodiment, the terminal A sends a pilot signal from each antenna 3 before sending an information signal (S101). When receiving the pilot signals, the terminal B estimates a propagation vector of each pilot signal as transmission-related information (S102). Although there are various specific methods of estimating a propagation vector, a specific example thereof will be described later. The terminal B determines, based on the estimated propagation vector, a transmission signal (transmission channel) to be used for sending an information signal (S103), and notifies the terminal A of the transmission signal to be used with a control signal (S104). When receiving the control signal, the terminal A selects the antenna 3 to be used based on the transmission signal to be used, and sends an information signal to the terminal B (S105).

By performing control in accordance with such a procedure, a transmission antenna can be selected in accordance with a propagation environment, and efficient signal transmission can be performed. This embodiment is applicable to any cases irrespective of the transmission/reception antennas. Particularly, in the case where the number N of the transmission antennas is larger than the number M of the reception antennas, by reducing the number of the transmission antennas used for sending, the information signal can smoothly be separated and received at the terminal B.

FIG. 1 shows a transmitter/receiver configuration in this control. In the figure, the terminal A1 (radio transmitter apparatus) includes a signal sending part 6, a control information receiving part 7, and a transmission signal determining part 8. On the other hand, the terminal B2 (radio receiver apparatus) includes a pilot signal detecting part 9, a transmission signal determining part 10, a control information transmitting part 11, and an information signal receiving part 12.

Furthermore, the terminal A1 includes N antennas 3, and the terminal B2 includes M antennas 4. The propagation characteristics of a propagation path 5 between a transmitter and a receiver are represented as a matrix $H=[h_{mn}]$.

An operation of this embodiment will be described in detail with reference to FIGS. 1 and 2. The signal sending part 6 of the terminal A1 sends a pilot signal from each antenna 3 before sending an information signal (S101). The pilot signal detecting part 9 of the terminal B detects (i.e., receives) the pilot signals from the terminal A through the antennas 4, and estimates a propagation vector of each pilot signal (S102). Although there are various specific methods of estimating a propagation vector, a specific example thereof will be described later. The transmission signal determining part 10 judges (i.e., determines) a transmission signal to be used for sending an information signal based on the estimated propagation vector. In this embodiment, a combination of transmission signals used for transmitting an information signal is determined (S103). The control information transmitting part 11 notifies the terminal A of the determined combination of transmission signals through the antennas 4 with a control signal (S104). FIG. 3 shows transmission of a control signal from the terminal B2 to the terminal A1. The terminal A1 receives the control signal from the terminal B2 through the antennas 3 at the control information receiving part 7, and the transmission signal determining part 8 determines a transmission signal to be used, based on the control signal, i.e., selects the antenna 3 to be used. After this, as shown in FIG. 4, the signal sending part 6 of the terminal A1 sends an information signal from the selected antenna 3 (S105), and the terminal B receives an information signal at the information signal receiving part 12.

In FIG. 5, (a) represents a pilot signal 20 of this control, and (b) represents an example of each format of the control signal 21. The terminal A sends pilot signals $s_n(p)$, which are different from one another, from each antenna 3. Furthermore, in the control signal from the terminal B to the terminal A, the terminal A is notified of "1" in the case where transmission is performed with respect to antennas numbered #1 to #N, and notified of "0" in the case where transmission is not performed. Various types of signal formats are considered, and this format is merely an example. Any signal format may be used, as long as it is a pilot signal that can be used for estimating a propagation vector or a control signal that can notify the terminal A of a transmission signal to be used.

FIG. 6 shows a configuration of estimating a propagation vector at the pilot signal detecting part 9 of the terminal B. The estimation of a propagation vector can be performed by obtaining a correlation between the received pilot signal and the known pilot signal $s_n(p)$ previously stored in the pilot signal detecting part 9 for each antenna.

More specifically, a propagation vector $h_n=[h_{11}, h_{21}, \ldots h_{M1}]^T$ can be estimated by the following expression with respect to a reception vector $x(p)=[x_1(p), \ldots, x_M(p)]^T$.

$$h_n = \Sigma_{p=1}^{N} s(p) s_n(p)^*$$

Herein, * represents a complex conjugate. Generally, this operation is realized using an MF (Matched Filter). Although FIG. 6 shows an example in which a propagation vector is estimated, any configuration other than this may be used, as long as propagation information that is transmission-related information regarding a reception signal to a pilot signal is detected. Furthermore, any parameter other than a propagation vector may be used, as long as the parameter serves as effective propagation information regarding a pilot signal.

When the pilot signal detecting part 9 calculates propagation information (estimation of a propagation vector), the transmission signal determining part 10 selects a transmission signal using the information. Various methods of selecting a transmission signal are considered. Hereinafter, in Embodiments 2 to 5, some examples will be shown regarding the method of selecting a transmission signal. The present invention is not limited to examples of a selection method described in Embodiments 2 to 5, and any selection method may be used as long as the transmission of an information signal is controlled using propagation information that is transmission-related information, whereby the efficiency of transmission is enhanced.

Embodiment 2

This embodiment relates to an efficient transmission control method and communication system for a MIMO system in which a plurality of signals are subjected to space division multiplexing (SDM) transmission. In particular, this embodiment shows one specific method regarding a method of selecting a transmission signal for the terminal B in Embodiment 1.

Figure 7:
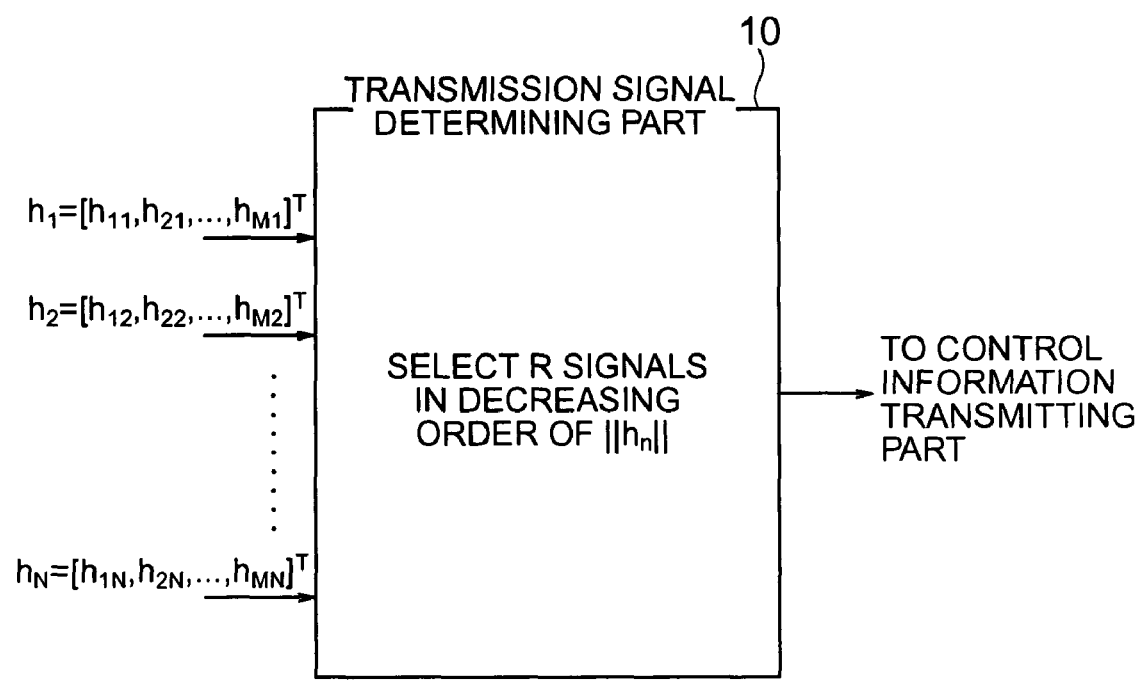
FIG. 7 A schematic view of a transmission signal determining part in Embodiment 2.
Figure 8:
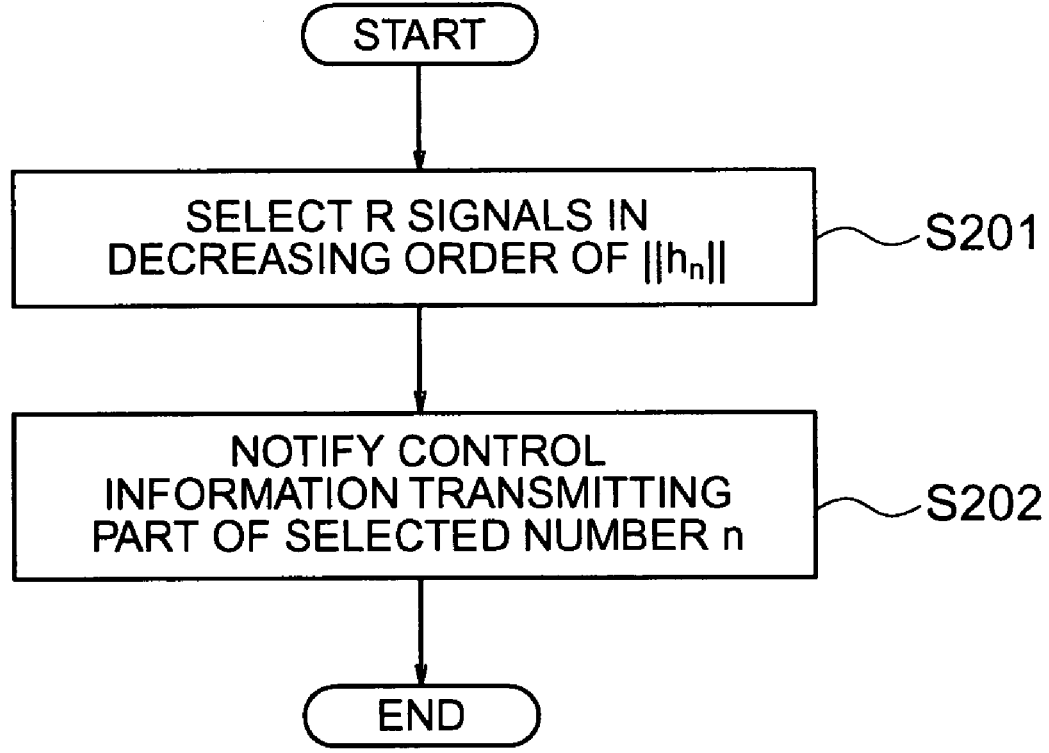
FIG. 8 A flowchart showing a processing procedure in the transmission signal determining part in Embodiment 2.

FIG. 7 shows a transmission signal determining part 10 in this embodiment. FIG. 8 is a flowchart showing a control procedure in the transmission signal determining part 10. Hereinafter, a method of selecting a transmission signal in this embodiment will be described with reference to FIGS. 7 and 8.

As shown in FIG. 7, the transmission signal determining part 10 selects R signals having power as large as possible from among a plurality of transmission signals. Specifically, when received a propagation vector $h_n$ from the pilot signal detecting part 9, the transmission signal determining part 10 of the terminal B selects R signals in a decreasing order of norm $\|h_n\|$ (S201). Then, the transmission signal determining part 10 notifies the control information transmitting part 11 of numbers n of the selected signals (S202).

According to the above selection, a channel having a satisfactory propagation environment can be selected to be used. Furthermore, by setting the number R of signals to be selected to be smaller than the number M of reception antennas, each information signal can also be separated and received at the terminal B.

Thus, according to this embodiment, a transmission signal (transmission channel) having a satisfactory propagation environment is selected to perform signal transmission. Furthermore, each information signal can smoothly be separated and received at the receiver.

Embodiment 3

This embodiment relates to an efficient transmission control method and communication system for a MIMO system in which a plurality of signals are subjected to space division multiplexing (SDM) transmission. In particular, this embodiment relates to one method regarding a method of selecting a transmission signal at the terminal B in Embodiment 1, which is different from that of Embodiment 2.

Figure 9:
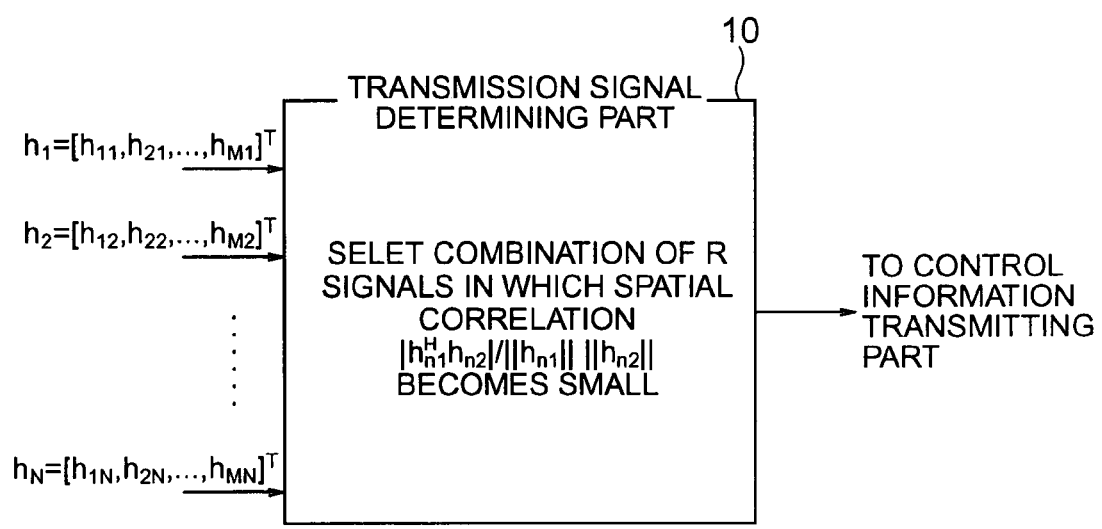
FIG. 9 A schematic view of a transmission signal determining part in Embodiment 3.
Figure 10:
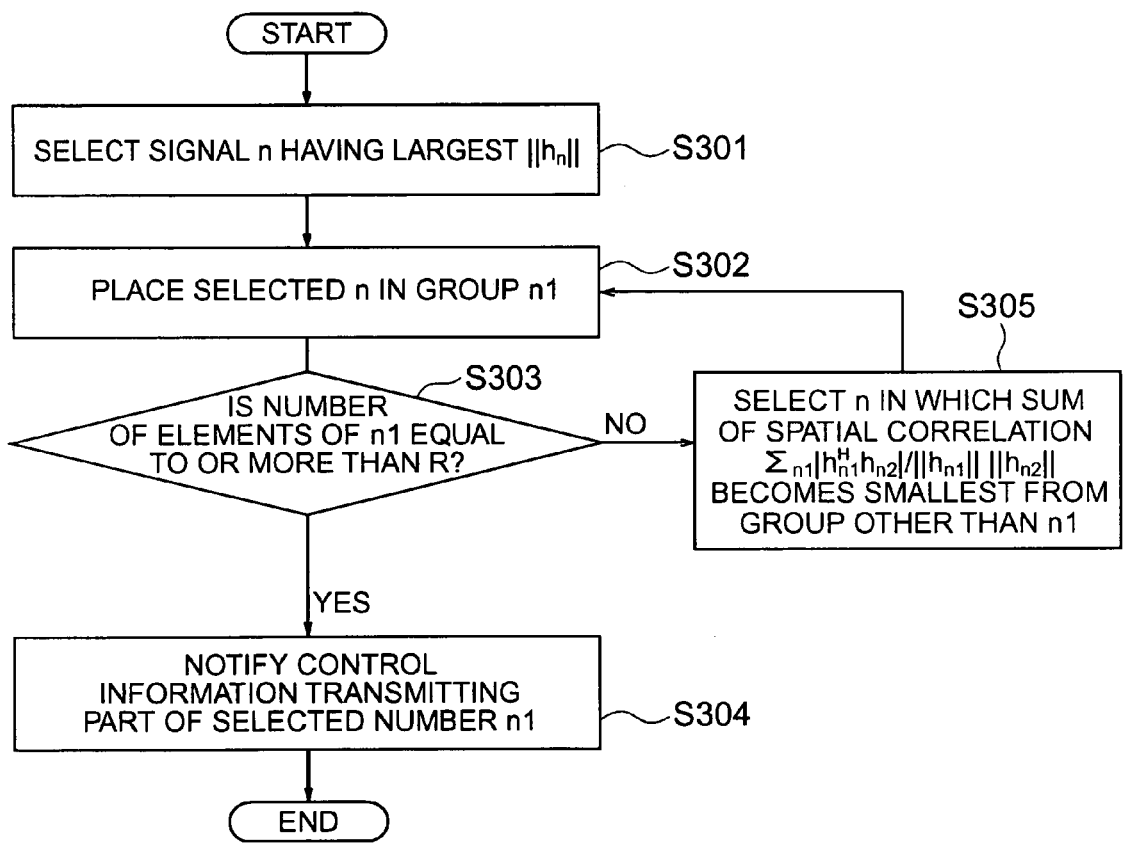
FIG. 10 A flowchart showing a processing procedure in the transmission signal determining part in Embodiment 3.

FIG. 9 shows a transmission signal determining part 10 in this embodiment, and FIG. 10 is a flowchart showing a control procedure in the transmission signal determining part 10. Hereinafter, a method of selecting a transmission signal in this embodiment will be described with reference to FIGS. 9 and 10.

As shown in FIG. 9, the transmission signal determining part 10 selects R signals from among a plurality of transmission signals such that the spatial correlation becomes as small as possible. Herein, the spatial correlation refers to a parameter defined by $$|h_{n1}^H h_{n2}|/(\|h_{n1}\| \|h_{n2}\|) \text{ or } |h_{n1}^H h_{n2}|, \text{ and}$$

as this parameter is smaller, signals n1, n2 are in a state close to a spatially orthogonal relationship. As the relationship between the signals is close to an orthogonal relationship, it is easy to separate two signals at the terminal B. According to this selection, signal transmission can be performed in an environment in which signals are likely to suppress one another. Accordingly, each information signal can easily be separated at the terminal B.

As a specific control procedure, when the propagation vector $h_n$ is estimated in the pilot signal detecting part 9 of the terminal B, first, the transmission signal determining part 10 selects a signal n at which a norm $\|h_n\|$ is maximum (S301). Then, the selected signal n is added to a group of a variable n1

(S302). In an initial state, the group of n1 does not have elements. In a case where the number of elements of the variable n1 is smaller than R (S303), a signal n at which the sum of spatial correlation of the signal belonging to the group n1 and the signal n:

$$\Sigma_{n1}|h_n^H h_{n1}|/(\|h_n\| \|h_{n1}\|)$$

is minimum is newly selected from the group other than the group of the variable n1 (S305), and the signal n is added to the group n1 as an element (S302). Furthermore, in a case where the number of elements of n1 is equal or larger than R at the end of Step S302 (S303), the control information transmitting part 11 is notified of the number selected as the group n1 (S304), and the processing is completed.

According to such a series of processing, a combination of signals having a small spatial correlation can be selected, and each information signal can smoothly be separated and received at the terminal B. Accordingly, high-efficient signal transmission can be performed. Furthermore, even in a case where the number N of transmission antennas is larger than the number M of reception antennas, by setting the number R of signals to be selected to be smaller than the number M of reception antennas, each information signal can be separated and received at the terminal B.

Embodiment 4

This embodiment relates to an efficient transmission control method and communication system in a MIMO system in which a plurality of signals are subjected to space division multiplexing (SDM) transmission. In particular, this embodiment relates to one method of selecting a transmission signal at the terminal B in Embodiment 1, which is different from those of Embodiment 2 and Embodiment 3.

Figure 11:
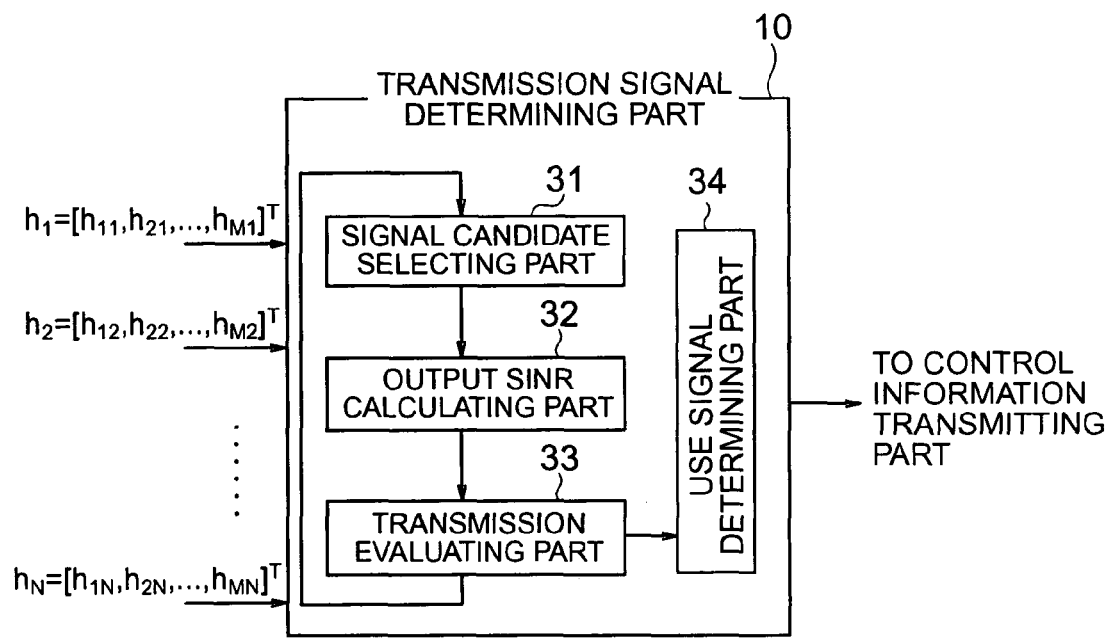
FIG. 11 A schematic view of a transmission signal determining part in Embodiment 4.
Figure 12:
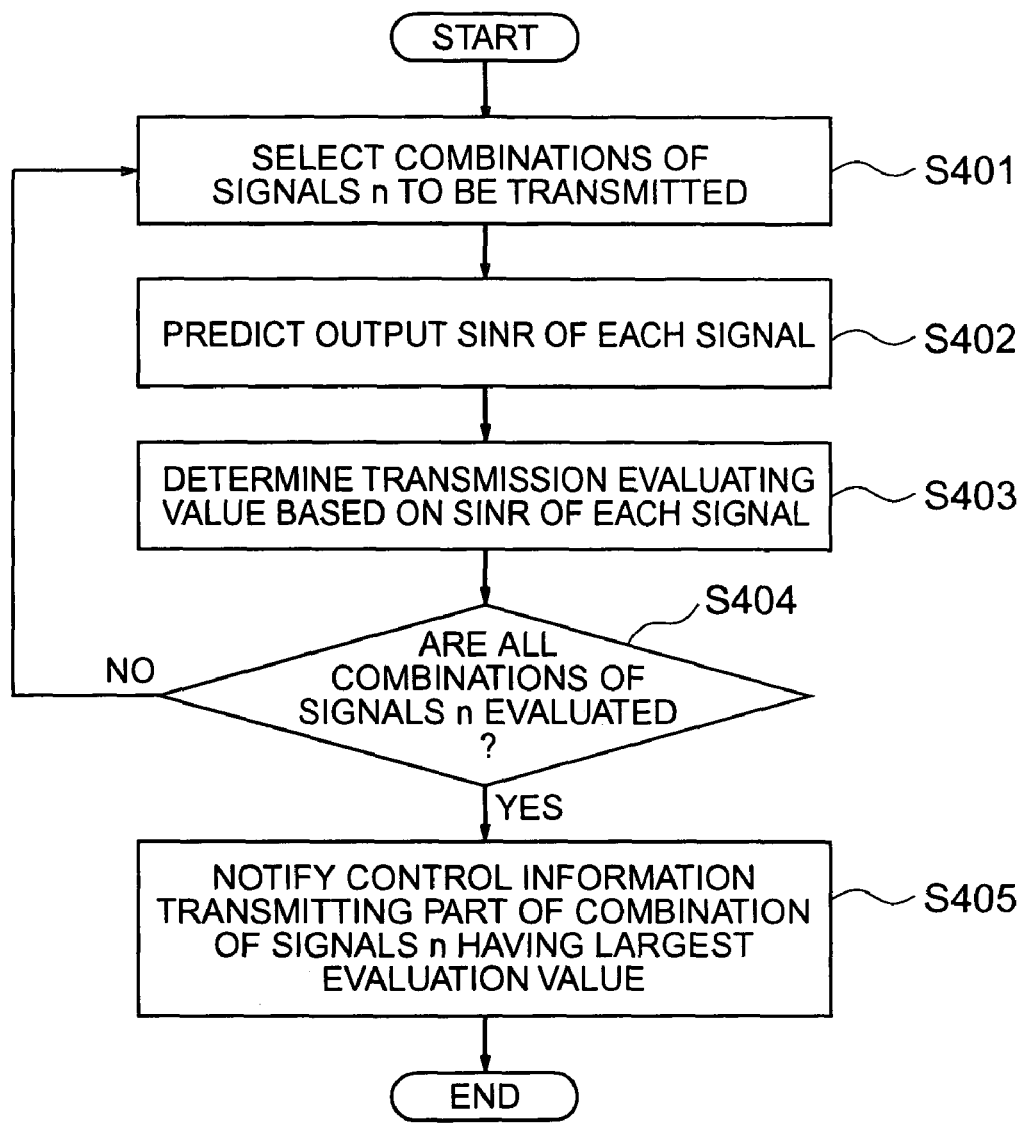
FIG. 12 A flowchart showing a processing procedure in the transmission signal determining part in Embodiment 4.

FIG. 11 shows a configuration of the transmission signal determining part 10 in this embodiment. FIG. 12 is a flowchart showing a control procedure in the transmission signal determining part 10. FIG. 13 shows an example of an SINR prediction method used in this embodiment, and FIG. 14 shows a correspondence table of an SINR for determining an evaluation value and an evaluation value in the transmission signal determining part 10. FIG. 15 shows results obtained by calculating an evaluation value with respect to various combinations of signals. A method of selecting a transmission signal of this embodiment will be described with reference to FIGS. 11 to 15.

As shown in FIG. 11, the transmission signal determining part 10 includes a signal candidate selecting part 31, an output signal to interference-plus-noise ratio (SINR) calculating part (hereinafter, referred to as an output SINR calculating part) 32, a transmission evaluating part 33, and a use signal determining part 34.

In the transmission signal determining part 10, first, the signal candidate selecting part 31 selects a candidate combination of transmission signals (S401). The output SINR calculating part 32 predicts an output SINR at the terminal B obtained in the case of sending a combination of transmission signals (S402). A specific example of a prediction method will be described later. The transmission evaluating part 33 determines an evaluation value with respect to the candidate combination of transmission signals from the predicted output SINR (S403). This evaluation is performed with respect to all various candidate combinations of transmission signals (S404). Finally, the use signal determining part 34 selects a combination of transmission signals whose evaluation value is highest, and notifies the control information transmitting part 11 of the combination (S405).

FIG. 13 shows a method of predicting an output SINR of each signal performed in Step S402 in the output SINR calculating part 32.

In calculation of the predicted SINR, a reception weight $v_n$ is first calculated using an estimated propagation vector $h_n$.

For example, in the case of a ZF standard and an MMSE synthesis standard, the reception eight $v_n$ is given by the following expression.

$$v_n = (\Sigma_{n0} h_{n0} h_{n0}^H)^{-1} h_{n0} \text{ (in the case of the ZF standard)}$$

$$V_n = (\Sigma_{n0} h_{n0} h_{n0}^H + P_N I)^{-1} h_{n0} \text{ (in the case of the MMSE standard)}$$

By calculating power of a desired signal and an interference noise component with respect to the operated reception weight, an output SINR can be obtained by the following (Expression 2).

$$\Gamma_n = |h_n^H v_n(p)|^2 / \{V_n^H (\Sigma_{n0} h_{n0} h_{n0}^H + P_N I) v_n - |h_n^H v_n(p)|^2\} \quad \text{(Expression 2)}$$

where $P_N$ is noise power, which is a value previously estimated.

The reception weight $v_n$ may be a weight operation other than the ZF standard and the MMSE standard. The SINR prediction expression of (Expression 2) is applicable to any weight $v_n$.

When the output SINR is thus obtained, the transmission evaluating part 33 determines a transmission evaluation value based on the SINR. Herein, as a specific example, a method of setting an evaluation value to 0 or 1 in accordance with the SINR will be described. However, this embodiment is not limited to the transmission evaluating method based on the SINR, and a combination of signals can be selected based on various evaluation standards.

The present invention is applicable to any MIMO system in which a candidate combination of signals is assumed, transmission evaluation is performed, and transmission control is performed using results thereof.

The transmission evaluating part 33 has a table for determining an evaluation value with respect to an SINR as shown in FIG. 14. Herein, in the case where the SINR is 4 dB or more, an evaluation value is set to 1, and otherwise, set to 0. This evaluation is executed respectively with respect to an output SINR of each signal.

FIG. 15 shows results obtained by performing the above evaluation with respect to various combinations 51 of signals. In this embodiment, various combinations of signals sent by three antennas are used. Herein, results obtained by performing the prediction of the output SINR 52, the calculation of the evaluation value 53 of each signal, and the calculation of the total 54 of the evaluation values (total evaluation value) are summarized. Thus, the total 54 of the evaluation values is calculated with respect to a combination of each signal, and a combination 55 of signals in which the total 54 of the evaluation values becomes maximum in the use signal determining part 34.

In the example shown in FIG. 15, in the case where the antennas #1 and #2 are used, and the antenna #3 is not used, the total of evaluation values becomes maximum, and this combination 55 is selected. In the case where a plurality of combinations reaching the maximum evaluation value are present, anyone of them is selected. The terminal A is notified of the selected combination of signals through the control information transmitting part 11.

According to such a control method, a transmission efficiency can be evaluated from various transmission environments, and a combination of signals having the most excellent transmission efficiency among them can be selected. As a result, compared with the conventional MIMO system in which transmission control is not performed, a communication system having a high transmission efficiency can be built.

This embodiment can be used for enhancing the transmission efficiency with respect to any number of transmission/reception antennas. In particular, when the number N of transmission antennas is larger than the number M of reception antennas, the transmission speed can be improved while achieving the state where signal division can be performed at the terminal B, thereby producing a great application effect.

Embodiment 5

This embodiment relates to an efficient transmission control method and communication system in a MIMO system in which a plurality of signals are subjected to Spatial Division Multiplexing (SDM) transmission. This embodiment has the same configuration of a transmitter/receiver as that of Embodiment 1. However, the control signal notified from the terminal B to the terminal A is different, and in this embodiment, a transmission format number of each transmission signal is notified.

Figure 16:
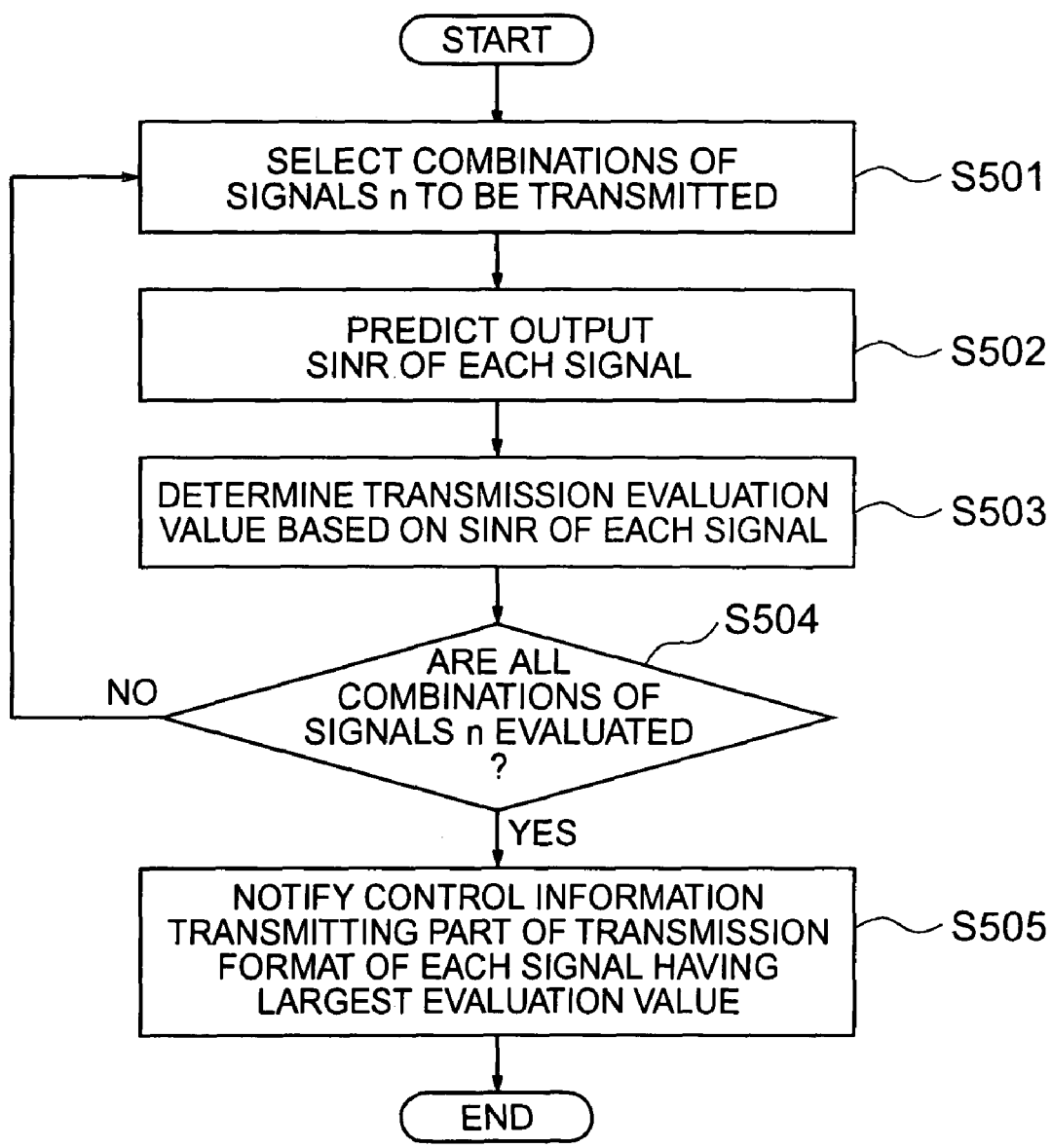
FIG. 16 A flowchart showing a control procedure in the transmission signal determining part in Embodiment 4.
Figure 19:
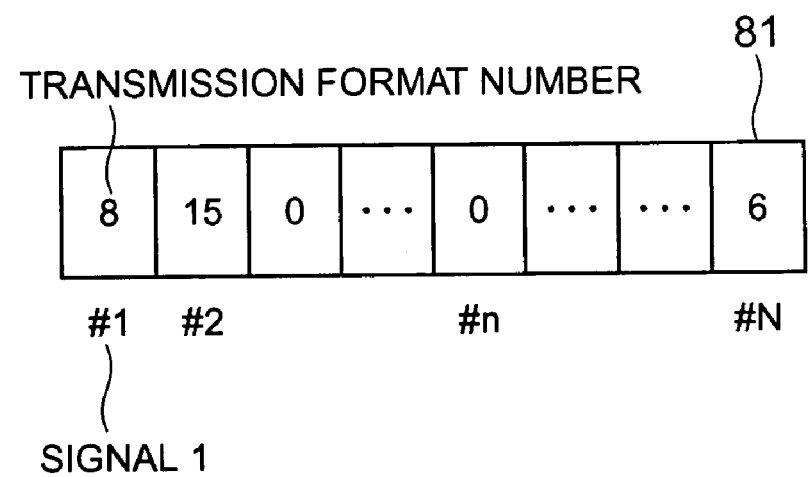
FIG. 19 A view showing an example of a format of a control signal used in Embodiment 5.

FIG. 16 shows a flowchart of a control procedure in the transmission signal determining part 10 in this embodiment. FIG. 17 is a correspondence table of an output SINR for determining an evaluation value and an evaluation value in the transmission signal determining part 10. FIG. 18 shows results obtained by calculating an evaluation value with respect to various combinations of signals. FIG. 19 shows an example of a frame format of a control signals transmitted from the terminal B to the terminal A. Hereinafter, this embodiment will be described with reference to FIGS. 16 to 19.

The transmission signal determining part 10 of this embodiment has the configuration in FIG. 11 in the same way as in Embodiment 4, and is composed of a signal candidate selecting part 31, an output SINR calculating part 32, a transmission evaluating part 33, and a use signal determining part 34. As a control procedure, first, the signal candidate selecting part 31 selects a candidate combination of transmission signals (S501), and the output SINR calculating part 32 predicts an output SINR of a signal with respect to the combination (S502). The transmission evaluating part 33 determines an evaluation value based on the results of the output SINR (S503). This evaluation value is calculated with respect to all various candidate combinations of signals (S504), and finally, a combination of transmission signals having a highest evaluation value is selected by the use signal determining part 34. In this case, the use signal determining part 34 determines a transmission format suitable for sending a combination of signals, and notifies the control information transmitting part 11 of a transmission format number (S505).

FIG. 17 is a table for determining an evaluation value with respect to an output SINR predicted value. This table shows a transmission format and a transmission speed that realize predetermined communication quality with respect to the output SINR predicted value. Herein, the predetermined communication quality refers to a required standard regarding a Bit Error Rate (BER), a Packet Error Rate (PER), or the like. More specifically, a format such as an encoding method (coding ratio, constraint length, etc.) and a modulation scheme is set to cause a transmission speed to be as high as possible within a range satisfying BER or PER of the required standard.

FIG. 17 shows the modulation scheme 63, the coding ratio 64, and the like to be used under a certain SINR 62. In general, as the SINR increases, the endurance to a bit error becomes higher, so that a coding ratio can be set to be larger. Furthermore, multi-value modulation can also be used. As a result, the transmission speed 65 increases with the enhancement of the SINR.

By using this table, it is possible to determine a transmission format for achieving predetermined required quality under a certain SINR, and a transmission speed thereof. Furthermore, if the transmission speed is used as an evaluation value, an evaluation value can also be calculated with respect to various combinations of signals.

FIG. 18 shows results obtained by calculating a total 74 of evaluation values, using a transmission speed as an evaluation value 73 of each signal with respect to various combinations 71 of signals. The use signal determining part 34 selects a combination of signals at which the total 74 of evaluation values becomes maximum in FIG. 18. In this embodiment, a combination (1,1,0) of signals at which the total of evaluation values becomes 10.5 is selected.

By selecting a combination at which the total of evaluation values becomes maximum, a transmission speed can be enhanced while a required quality standard is being satisfied in a MIMO system.

When a combination of signals is thus selected, a transmission format number is determined with reference to FIG. 17, and the terminal A is notified of the transmission format number through the control information transmitting part 11. FIG. 19 is an example showing a configuration of the control signal 81, and a transmission format number is specified for each signal. In this figure, "0" represents a transmission format number that is not used as a transmission signal. Furthermore, "8", "15", and "6" represent transmission format numbers when used as transmission signals, and in this embodiment, as shown in FIG. 17, transmission specification numbers "1" to "31" are selected in accordance with an SINR of each signal of the selected combination.

As described above, the terminal B selects a transmission format number corresponding to a combination of transmission signals, and notifies the terminal A of the transmission format number. The terminal A that is notified of the transmission format number transmits an information signal in accordance with a transmission format and a transmission speed corresponding to the notified transmission format number.

According to this procedure, communication with a higher transmission speed can be realized while satisfying required communication quality, compared with the conventional MIMO system in which transmission control is not performed and the above-mentioned Embodiments 1 to 4. Thus, by adding a degree of freedom to the transmission format, more detailed system design can be performed, which can enhance a transmission speed.

In the above description, although a transmission speed is used as an evaluation value, a parameter other than the transmission speed may be used as an evaluation value.

Embodiment 6

This embodiment relates to an efficient transmission control method and communication system in a MIMO system in which a plurality of signals are subjected to space division multiplexing (SDM) transmission. In particular, this embodiment shows SDM transmission performing multi-carrier transmission.

Figure 20:
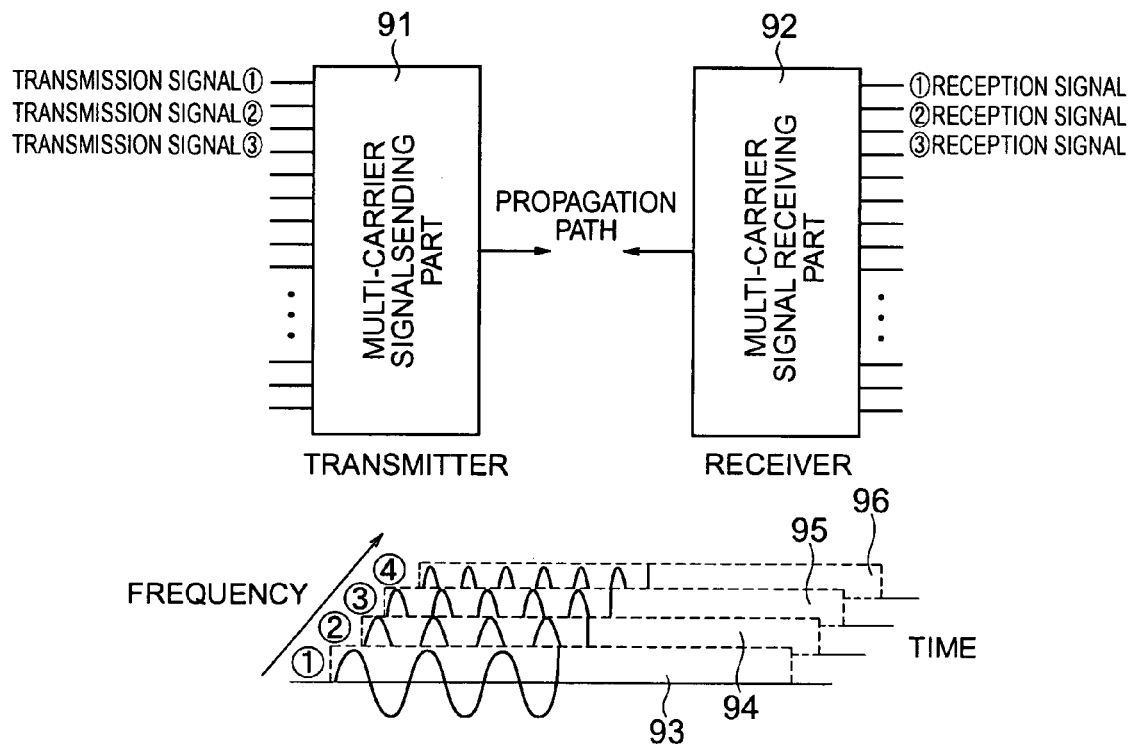
FIG. 20 A basic structural view of a multi-carrier communication system.
Figure 21:
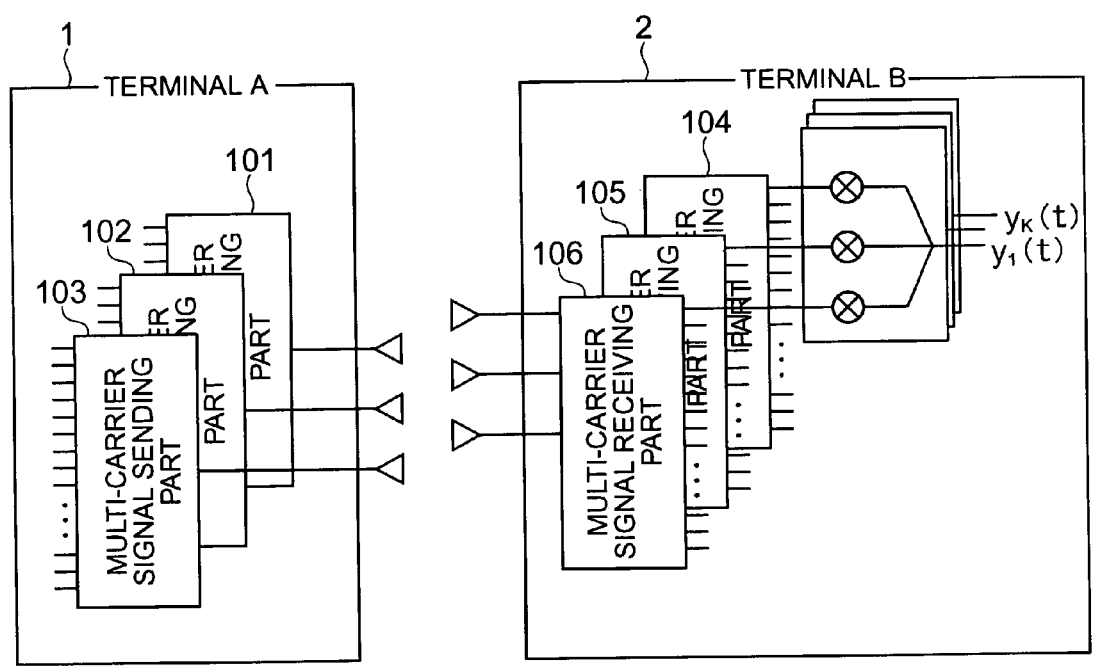
FIG. 21 A structural view of a transmitter/receiver of multi-carrier SDM transmission in Embodiment 6.

FIG. 20 is a basic structural view illustrating general multi-carrier transmission. FIG. 21 is a structural view of transmission/reception in the case of applying the MIMO system to multi-carrier transmission. Hereinafter, this embodiment will be described with reference to FIGS. 20 and 21.

Recently, in radio communication, there is a great demand for a system capable of performing higher-speed transmission and higher-speed movement, which necessitates broadband radio transmission. Regarding the transmission of a broadband signal, in particular, attention is being paid to a multi-carrier system performing parallel transmission of signals simultaneously using a plurality of carriers. According to the multi-carrier transmission system, low-speed data are arranged in parallel on a frequency, and sent simultaneously using different carriers. An attempt is made to enhance the transmission speed by performing parallel transmission of signals.

FIG. 20 is a basic structural view of a multi-carrier communication system. As shown in the figure, in a multi-carrier signal sending part 91, a plurality of signals are multiplexed (93 to 96) with a plurality of different frequencies, whereby signal transmission is performed. Furthermore, in the multi-carrier signal receiving part 92 on a receiving side, signals multiplexed (93 to 96) with a plurality of different frequencies are separated to obtain a reception signal of each carrier. As shown in this figure, the signals multiplexed in the multi-carrier signal sending part 91 are transmitted under the condition of being multiplexed (93 to 96) with a plurality of frequencies. In this case, signals transmitted by each carrier can be dealt with independently. More specifically, individual signal processing can be performed for each carrier in the same way as in single-carrier transmission. Thus, in Embodiments 1 to 5, although the case of the single-carrier transmission has been described, the similar access control method can also be applied to the multi-carrier transmission system.

FIG. 21 shows a configuration of signal processing in which the MIMO system of the present invention is applied to the multi-carrier transmission system. As shown in this figure, by configuring the MIMO system shown in Embodiments 1 to 5 for each carrier, the MIMO system of the present invention can be applied to even the multi-carrier transmission system. That is, the terminal A1 includes multi-carrier signal sending parts 101 to 103, and the terminal B2 includes multi-carrier signal receiving parts 104 to 106.

Embodiment 7

This embodiment shows a transmission control method and a communication system different from those of Embodiment 6, in particular, regarding the SDM transmission performing multi-carrier transmission.

By performing transmission control independently for each sub-carrier (each carrier) as shown in Embodiment 6, the control similar to that in the case of a single carrier can be performed. However, when independent control is performed with respect to all the sub-carriers, there is a problem in that a control amount increases. Then, in this embodiment, a method of enabling efficient signal transmission in a MIMO system while reducing a control amount will be described.

Figure 22:
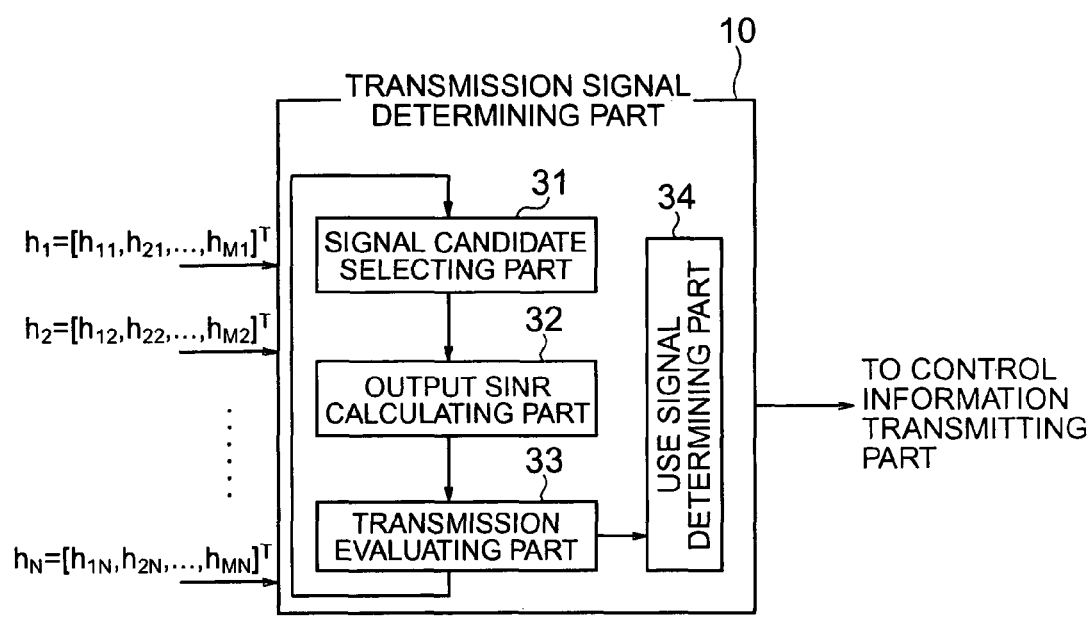
FIG. 22 A configuration view of a configuration of a transmission signal determining part in Embodiment 7.
Figure 23:
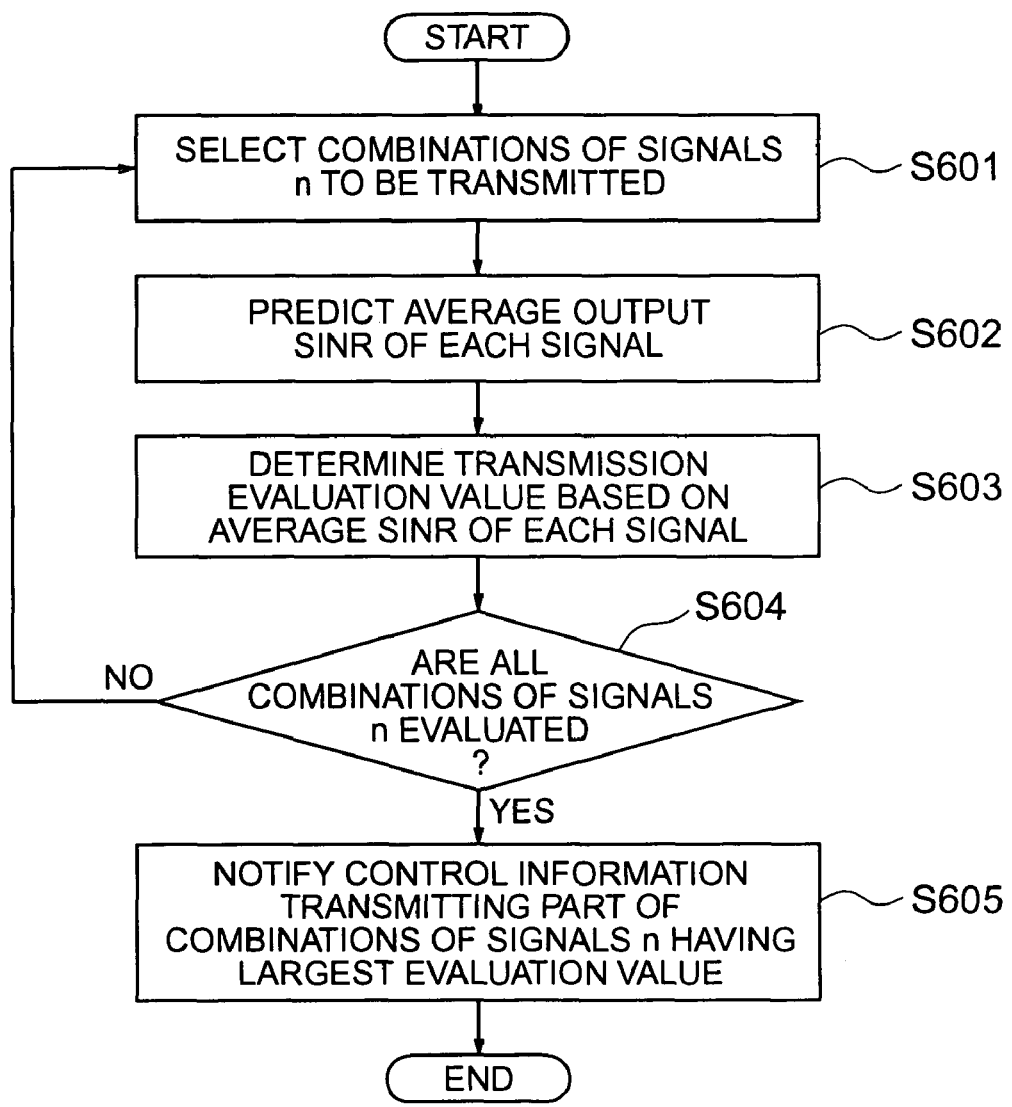
FIG. 23 A flowchart showing a processing procedure in the transmission signal determining part in Embodiment 7.

FIG. 22 is a structural view of the transmission signal determining part 10, and FIG. 23 is a flowchart showing control performed in the transmission signal determining part 10. FIG. 24 shows an average SINR calculation method used in the transmission signal determining part 10. Hereinafter, this embodiment will be described with reference to FIGS. 22 to 24.

In Embodiment 6, although the evaluation and the selection of a signal are performed for each sub-carrier, in this embodiment, one transmission evaluation and selection of a signal are performed with respect to all the sub-carriers. More specifically, an evaluation value with respect to all the sub-carriers is set, and the selection of a transmission signal of all the sub-carriers is performed in accordance with the evaluation value. As the evaluation value, various parameters such as average signal power, an average spatial correlation, and an average SINR can be used. Herein, the case of using an average SINR will be described as the use of one of the parameters.

FIG. 22 shows a configuration of the transmission signal determining part 10 in the case of performing one transmission evaluation and signal selection with respect to all the sub-carriers. According to this procedure, first, the signal candidate selecting part 31 selects a candidate combination of transmission signals (S601), and the average output SINR calculating part 35 predicts an average output SINR (S602). A method of predicating and calculating an average output SINR will be described later. The transmission evaluating part 33 determines an evaluation value with respect to the candidate combination of transmission signals from the prediction results of an average output SINR (S603). This evaluation is performed with respect to all various combinations of transmission signals (S604), and finally, the use signal determining part 34 selects a combination of transmission signals having a highest evaluation value and notifies the control information transmitting part 11 of the combination (S605).

This procedure is configured in the same way as in Embodiment 4, except for using an average output SINR in place of output SINR. Furthermore, by using average signal power, an average spatial correlation, and an average SINR, even Embodiments 2, 3, and 5 can be extended to a control method of this embodiment during multi-carrier transmission.

FIG. 24 shows a method of calculating average SINR. Herein, $\Gamma_{n,1}$ (n: transmission antenna number, 1: sub-carrier number) that is an SINR of each sub-carrier is calculated in the same way as in Embodiment 4 with respect to a signal candidate. After this, by averaging an SINR among sub-carriers, $\Gamma_n$ that is an average SINR with respect to all the sub-carriers is calculated by the following Expression.

$$\Gamma_n = E_1[\Gamma_{n,1}]$$

where $E_1[\bullet]$ represents performing average regarding 1.

In the multi-carrier transmission, encoding/decoding is generally performed over a plurality of sub-carriers in most cases. In this case, the multi-carrier reception characteristics greatly depend upon an average SINR, and the transmission characteristics can be substantially grasped based on the average SINR. Thus, in the multi-carrier transmission, by using an averaging parameter with respect to all the sub-carriers, efficient signal selection can be performed with a small control amount.

In this embodiment, a combination of signals to be used is selected using an average SINR, and the terminal A is notified of the combination with a control signal. In this case, the control signal is common to all the sub-carriers, and the control amount can be greatly reduced compared with Embodiment 6 in which a control method is required for each sub-carrier.

Embodiment 8

This embodiment shows a method of sending a signal at the terminal A, which is different from Embodiments 1 to 7 in SDM transmission.

In the SDM transmission of Embodiments 1 to 7, the terminal A sends a pilot signal and an information signal from each antenna 3. However, the terminal A may not necessarily send a signal individually from each antenna 3. In this embodiment, the case where the terminal A performs transmission of a pilot signal and an information signal using a transmission beam will be described.

Figure 25:
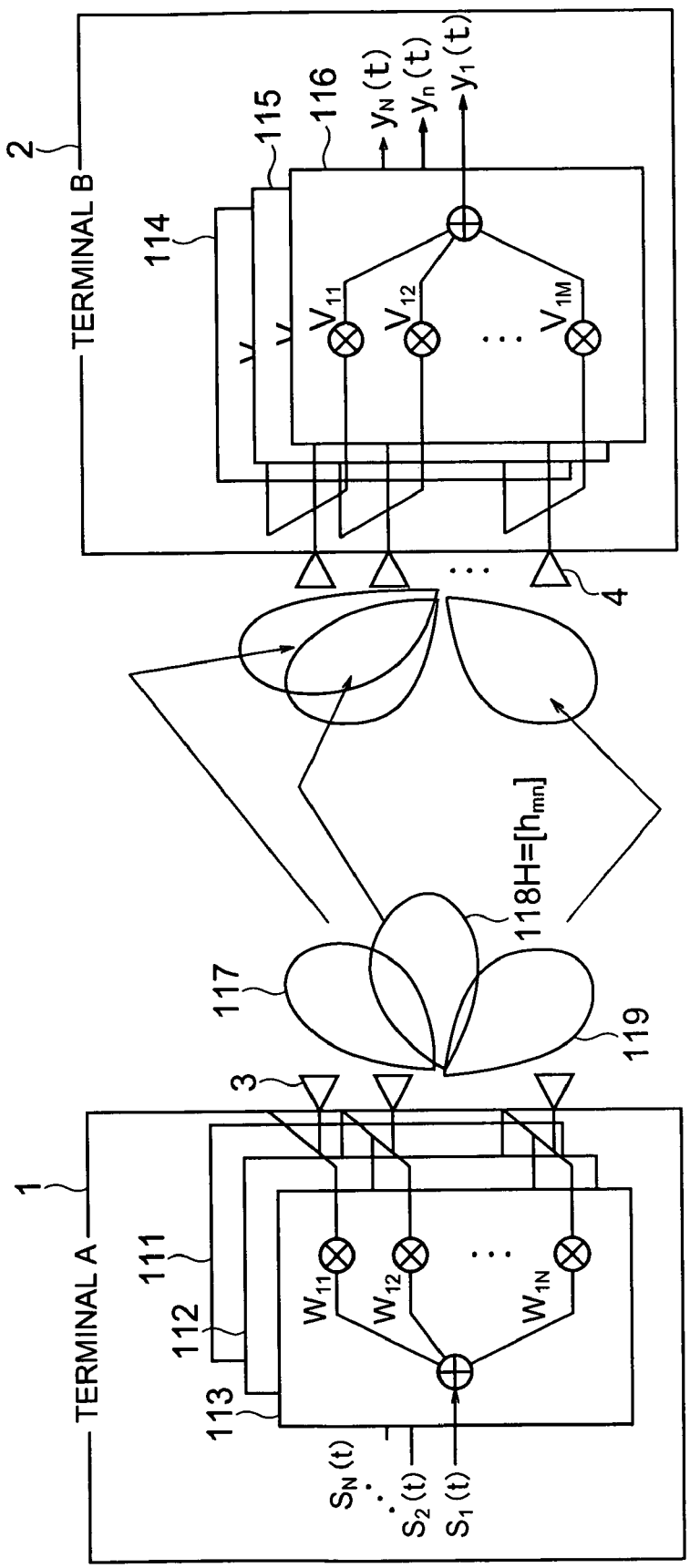
FIG. 25 A basic structural view of a transmitter/receiver for a MIMO system in Embodiment 8.
Figure 26:
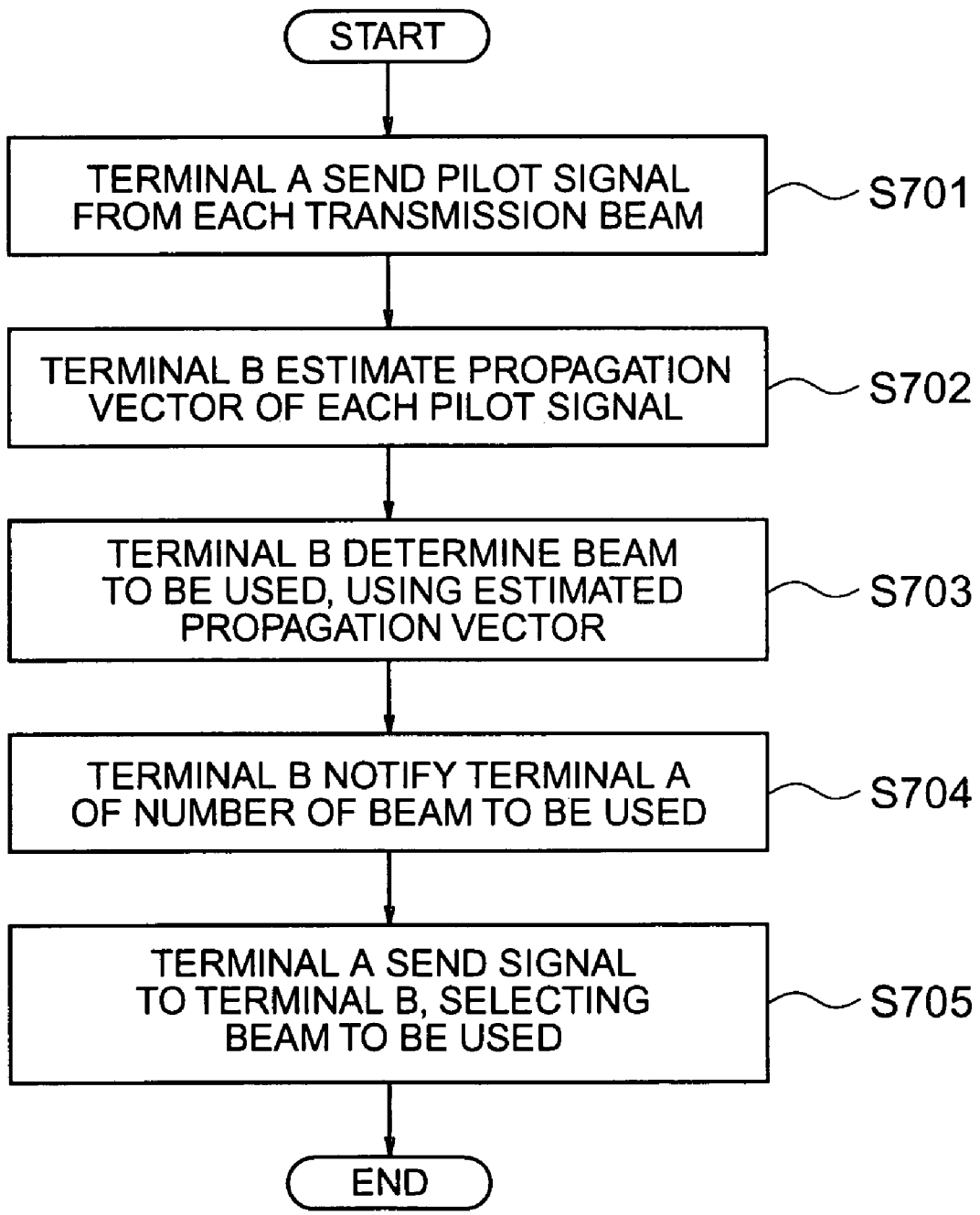
FIG. 26 A flowchart showing a transmission control method in Embodiment 8.

FIG. 25 is a structural view of a transmitter/receiver in this embodiment. The terminal A1 includes transmission weight calculators 111, 112, and 113, and the terminal B2 includes reception weight multipliers 114, 115, and 116, whereby transmission beams 117, 118, and 119 are formed. FIG. 26 is a flowchart showing a control procedure in this embodiment. Hereinafter, this embodiment will be described with reference to FIGS. 25 and 26.

In this embodiment, the terminal A multiplies a transmission signal $s_n(p)$ by a weight $w_n=[w_{n1}, w_{n2}, \ldots, w_{nN}]^T$ to obtain a signal of each antenna 3. In the case where there are a plurality of transmission signals, the terminal A multiplies the transmission signals by different weights $w_n$ to generate signals individually for the respective antennas 3, and sends a plurality of signals concurrently. In this case, the transmission signals of the terminal A have directivity, whereby transmission beams 117 to 119 are formed. Thus, the terminal A can also send signals from the respective transmission beams 117 to 119 instead of the respective antennas 3.

A procedure of transmission control of a MIMO system using transmission beam forming will be described with reference to FIG. 26 below. The terminal A first sends pilot signals from the respective transmission beams 117 to 119 (S701). When receiving a pilot signal, the terminal B estimates a propagation vector of each signal (S702). Furthermore, the terminal B determines a transmission beam to be used based on the estimated propagation vector (S703) and notifies the terminal A of a transmission beam to be used with a control signal (S704). When receiving the control signal, the terminal A selects a transmission beam to be used and sends an information signal to the terminal B (S705).

Thus, even in the case where the terminal A sends a signal using a transmission beam, efficient SDM transmission can be performed owing to the transmission control between the terminal A and the terminal B, respectively. Similarly, all the procedures of Embodiments 1 to 7 can be extended to the case of using a transmission beam.

The number of transmission beams is not necessarily the same as that of reception antennas. The number of transmission beams is determined based on the number of weight multipliers, and can be set to be either larger or smaller than the number of transmission antennas. For example, the terminal A having two antennas 3 can also send four signals using four transmission beams.

Embodiment 9

In this embodiment, the application range of the methods of controlling transmission of Embodiments 1 and 8 can be further extended with respect to SDM transmission.

In Embodiment 8 and Embodiment 1, a method of controlling transmission has been stated based on the following premises:

(1) the terminal A transmits a pilot signal from each transmission beam; and (2) the terminal A transmits a pilot signal from each antenna 3, respectively. However, actually, the terminal B can control transmission even without recognizing whether the state is (1) or (2).

Figure 27:
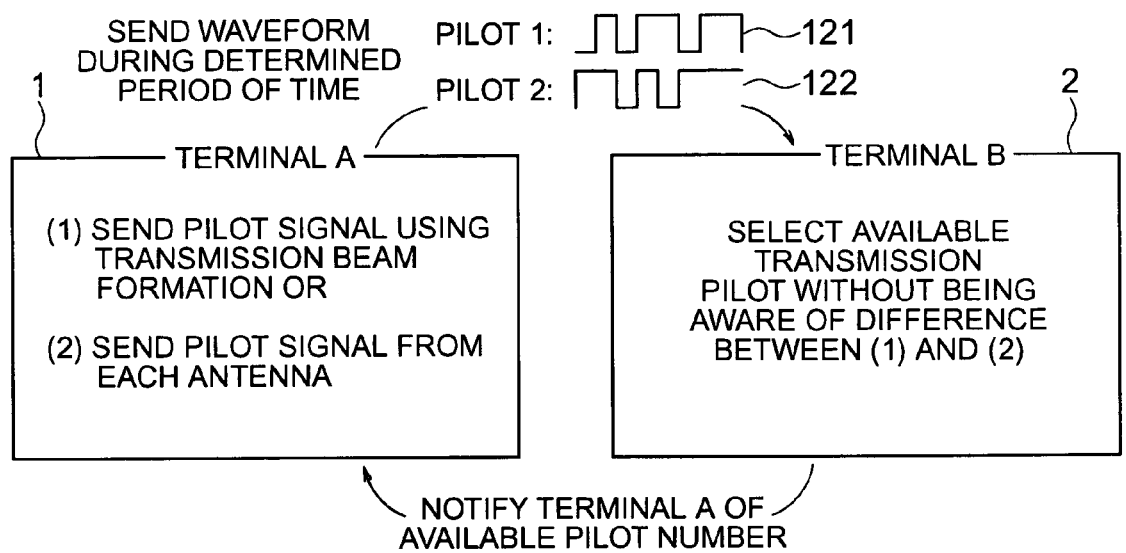
FIG. 27 A conceptual view of a transmitter/receiver for a MIMO system in Embodiment 9.
Figure 28:
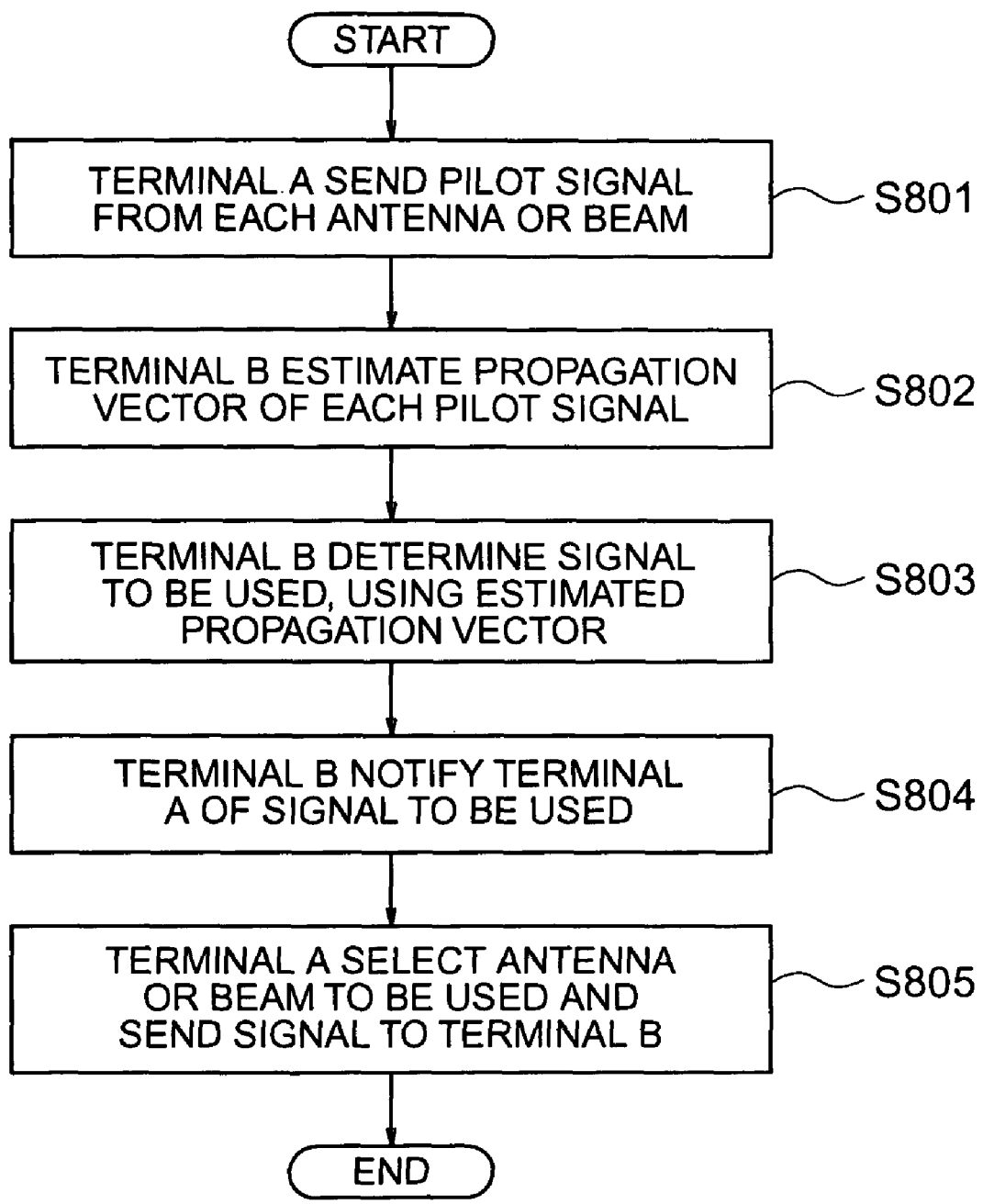
FIG. 28 A flowchart showing a transmission control method in Embodiment 9.

FIG. 27 shows a concept of this transmission control method, and FIG. 28 shows an example of a flowchart of this embodiment. The terminal A1 sends pilot signals 121 and 122 in either state (1) or (2) (S801). At this time, the terminal B2 can estimate propagation vectors with respect to the pilot signals even without recognizing either one of (1) and (2) (S802). Furthermore, the terminal B can estimate any of signal power, a spatial correlation, and an output SINR by learning only a series of pilot signals. Furthermore, the terminal B can also select appropriate signals corresponding to the pilot signals based on the results (S803). Furthermore, the terminal B can also notify the terminal A of a number of a transmission signal to be used (S804), thereby notifying the terminal A of the signal to be used. The terminal A having received a control signal sends an information signal to the terminal B from an antenna or a transmission beam (S805).

Thus, if the terminal B learns only a series of pilot signals, the terminal B can perform the entire transmission control smoothly even when the terminal A does not recognize any of the states (1) and (2). As a result, even when the terminal A uses an arbitrary transmission beam or the like irrespective of the terminal B, there arises no problem in transmission control.

From the above results, only a series of pilot signals is determined as a standard previously between terminals, and the use of a transmission beam can be subjected to the free determination of each terminal. As a result, it is not necessary to perform recognition and notification with respect to the presence/absence of a beam between terminals, and the terminal A can use transmission beam formation with a small control amount.

Embodiment 10

This embodiment relates to an efficient signal transmission method and communication system in a MIMO system in which a plurality of signals are subjected to space division multiplexing (SDM) transmission.

Unlike the control signal sent from the terminal B to the terminal A in Embodiment 5, in particular, this embodiment is characterized in that the terminal B determines transmission power of each signal, and notifies the terminal A of the transmission power in addition to a transmission format number.

Figure 30:
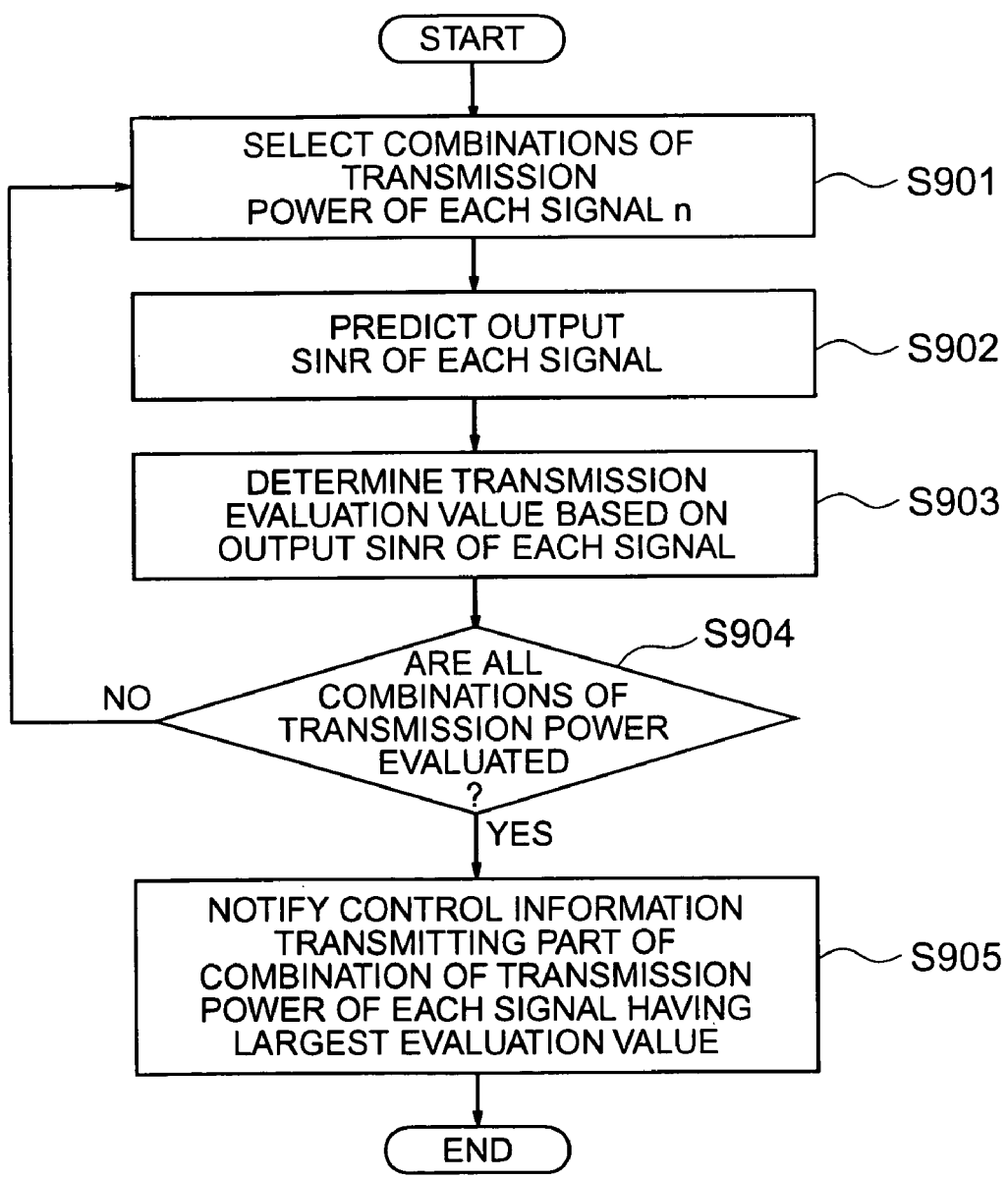
FIG. 30 A flowchart showing a processing procedure in the transmission signal determining part in Embodiment 10.
Figure 31:
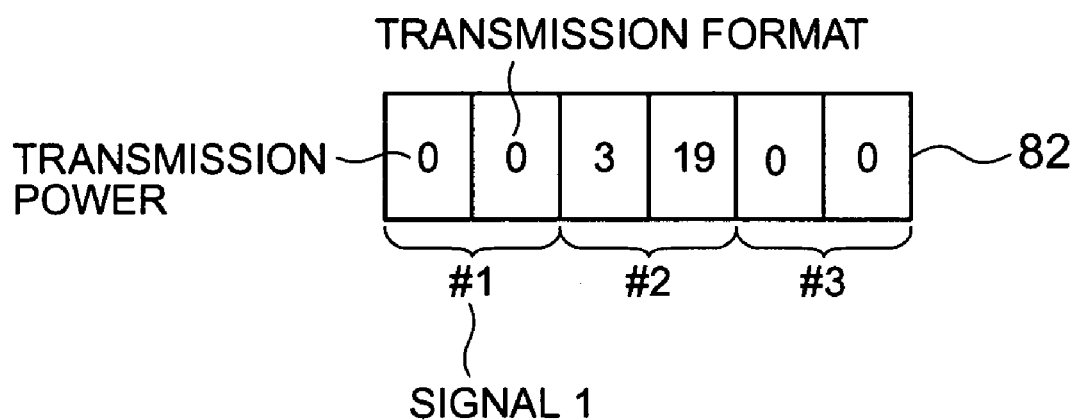
FIG. 31 A view showing one example of a format of a control signal used in Embodiment 10.
Figure 32:
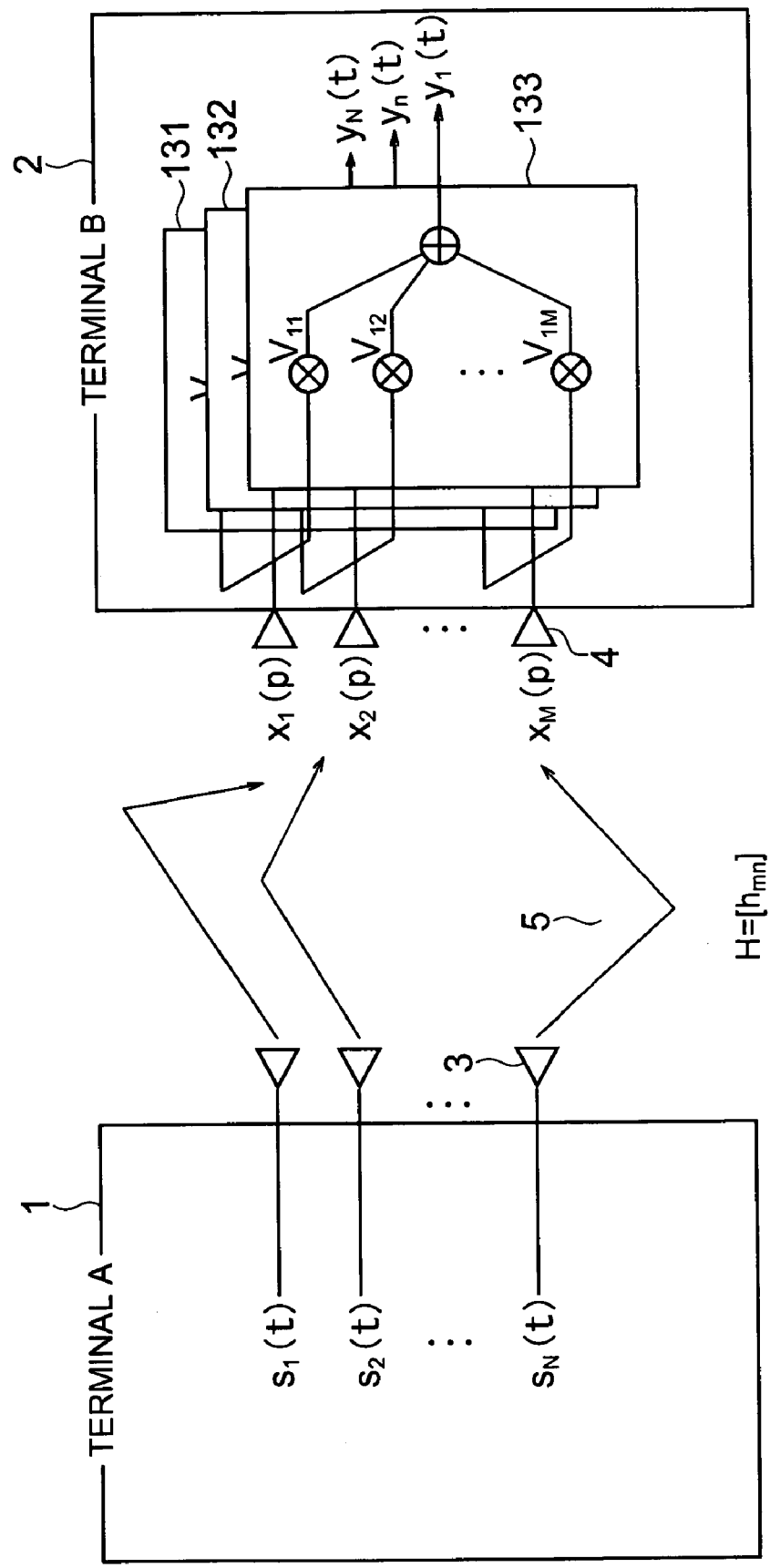
FIG. 32 A structural view of a transmitter/receiver during SDMA transmission according to prior art.
Figure 33:
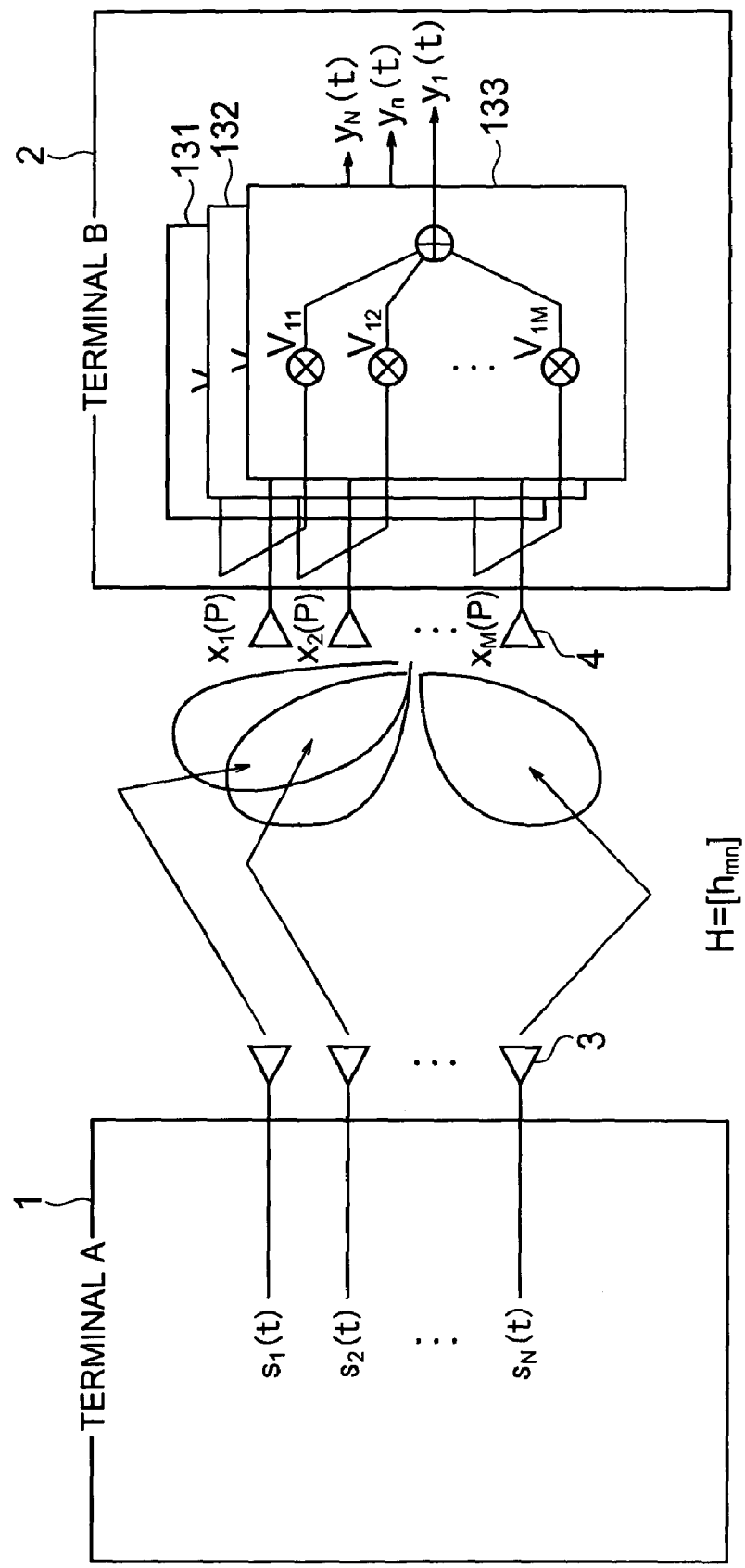
FIG. 33 A conceptual view of a transmitter/receiver configuration, and of reception beam formation during SDMA transmission according to prior art.

FIG. 29 shows results obtained by calculating an evaluation value with respect to various combinations of signals in the transmission signal determining part 10. FIG. 30 shows an example of a flowchart of this embodiment used in the transmission signal determining part 10. FIG. 31 is an example of frame format of a control signal 82 transmitted from the terminal B to the terminal A. Hereinafter, this embodiment will be described with reference to FIGS. 29 to 31.

The transmission signal determining part 10 of this embodiment has the same configuration as that shown in FIG. 11, and includes a signal candidate selecting part 31, an output SINR calculating part 32, a transmission evaluating part 33, and a use signal determining part 34. However, the transmission signal determining part 10 of this embodiment is different from that of the above-mentioned Embodiment 5 in that transmission power is also transmitted from the terminal B to the terminal A in addition to a transmission format number.

As a control procedure, first, the signal candidate selecting part 31 selects a combination 75 of levels of transmission power of each signal (S901), and the output SINR calculating part 32 predicts an output SINR 72 at the terminal B (S902). The transmission evaluating part 33 calculates an evaluation value (transmission speed) 73 with respect to each signal from the prediction results of each output SINR 72, and adds up the evaluation values with respect to the respective signals to determine a total 74 of transmission evaluation values (S903). This evaluation is performed with respect to various combinations of levels of transmission power of signals (S904), and finally, the use signal determining part 34 selects a combination of transmission power having a highest total of evaluation values and notifies the control information transmitting part 11 of the combination (S905).

FIG. 29 shows results obtained by predicting the output SINR 72 with respect to various combinations 75 of levels of signal power, and calculating an evaluation value. Herein, assuming that the power of an information signal is changed with respect to the power of a pilot signal, the output SINR 72 is predicted. This SINR prediction can be performed using the same operation method as that of (Expression 2). Furthermore, an evaluation value is determined using the predicted SINR. Thus, by calculating an evaluation value with respect to various combinations of levels of power, and selecting a combination having a highest total evaluation value, transmission power can be optimized. It should be noted that a combination of levels of power is created so that the total power of transmission signals is within a predetermined range.

Thus, when a combination of levels of power of each signal is selected, the terminal A is notified of a transmission format number of the combination through the control information transmitting part 11 together with the transmission power determined with reference to FIG. 17 in the same way as in Embodiment 5. FIG. 31 shows an example showing a configuration of a control signal 82. In FIG. 31, the transmission power corresponding to each signal is described in the left column as a ratio with respect to the current pilot signal, and the numerical value in the right column represents a transmission format number. In the item of power of this control signal, "0" to "3" are defined as the magnitude of the transmission power when used for a transmission signal, and "0" represents the case where the transmission format number is not used as a transmission signal. Furthermore, regarding the transmission format number, "0" shows that the transmission format number is not used as a transmission signal, and regarding the numbers used as transmission signals, transmission specification numbers "1" to "31" are selected in the same way as in Embodiment 5.

As described above, the terminal B selects a combination of transmission power, and notifies the terminal A of the combination. The notified terminal A transmits an information signal in accordance with the notified transmission power and transmission format number.

In Examples 1 to 9, although a change in transmission power of a signal has not been considered, the power of each transmission signal can be optimized in this embodiment. As a result, signal transmission can be performed more efficiently in the MIMO system, considering also transmission power.

In this embodiment, although the case of applying a combination of power to Embodiment 5 has been described, the same procedure can be applied similarly to Embodiments 1 to 9. More specifically, the method of selecting power using an SINR described in this embodiment is merely one specific example of the present invention, and various configurations of a MIMO system, in which the terminal B determines power based on propagation information and performs transmission control, can be used.

Embodiment 11

This embodiment shows the case where a MIMO system and a CDMA system are used in combination.

When a DS-CDMA system and a multi-carrier CDMA system and a MIMO system are used in combination, after a code spreaded pilot signal is despreaded at the terminal B, the procedure similar to those of Embodiments 1 to 10 can be applied. Thus, the transmission control methods of Embodiments 1 to 10 can also be used in combination with a CDMA system such as the DS-CDMA system and the multi-carrier CDMA system.

INDUSTRIAL APPLICABILITY

A receiver selects a transmission method of a signal from a transmitter based on a pilot signal from the transmitter, and notifies the transmitter of the transmission method, and the transmitter sends an information signal to the receiver in accordance with a signal transmission method. Therefore, the present invention is applicable to a radio communication device in which signal separation can be performed smoothly, enhancing a transmission efficiency.

The invention claimed is:

1. A radio communication method by a radio communication system in which output signals are generated from a plurality of information signals and then transmitted respectively at a plurality of different frequencies to a system of a communication partner from N antennas, the method comprising:

receiving control information by a control signal which is transmitted by the system of the communication partner; and transmitting transmission signals respectively at the plurality of frequencies from the N antennas based on the received control information, the transmission signals each being generated based on a first operation result, which is obtained by multiplying a first information signal by a first N-dimensional weight vector, and a second operation result, which is obtained by multiplying a second information signal by a second N-dimensional weight vector, wherein the control information includes weight-related information including a set of the first N-dimensional weight vector and the second N-dimensional weight vector, the first information signal and the second information signal include one of a set of signals modulated by different modulation schemes and a set of signals encoded by different encoding methods, and the weight-related information is common to all of the plurality of frequencies used for signal transmission from the radio communication system to the system of the communication partner.

2. A radio communication system in which output signals are generated from a plurality of information signals and then transmitted respectively at a plurality of different frequencies to a system of a communication partner from N antennas, comprising:

reception means for receiving control information by a control signal which is transmitted by the system of the communication partner; and transmission means for transmitting transmission signals respectively at the plurality of frequencies from the N antennas based on the received control information, the transmission signals each being generated based on a first operation result, which is obtained by multiplying a first information signal by a first N-dimensional weight vector, and a second operation result, which is obtained by multiplying a second information signal by a second N-dimensional weight vector, wherein the control information includes weight-related information including a set of the first N-dimensional weight vector and the second N-dimensional weight vector, the first information signal and the second information signal include one of a set of signals modulated by different modulation schemes and a set of signals encoded by different encoding methods, and the weight-related information is common to all of the plurality of frequencies used for signal transmission from the radio communication system to the system of the communication partner.

* * * * *

UNITED STATES PATENT AND TRADEMARK OFFICE
CERTIFICATE OF CORRECTION

PATENT NO.        : 8,125,963 B2
APPLICATION NO.   : 10/567339
DATED             : February 28, 2012
INVENTOR(S)       : Yoshitaka Hara et al.

It is certified that error appears in the above-identified patent and that said Letters Patent is hereby corrected as shown below:

On the title page, Item 75, the inventors information is incorrect. Item 75 should read:

-- (75)   Inventors: Yoshitaka Hara, Tokyo (JP); Akinori Taira, Tokyo (JP);
          Tomoaki Otsuki, Noda (JP); Kenji Suto, Noda (JP) --

Signed and Sealed this
Twenty-ninth Day of May, 2012

David J. Kappos
*Director of the United States Patent and Trademark Office*